US009276807B2

(12) United States Patent
Nasir et al.

(10) Patent No.: US 9,276,807 B2
(45) Date of Patent: Mar. 1, 2016

(54) REDUNDANT COMMUNICATION FRAMEWORK

(71) Applicant: Verizon Patent and Licensing Inc., Basking Ridge, NJ (US)

(72) Inventors: Azim Nasir, Foxboro, MA (US); Hong Xiao, Acton, MA (US); Dongchen Wang, Concord, MA (US); Andre R. Turner, Belmont, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 148 days.

(21) Appl. No.: 14/061,444

(22) Filed: Oct. 23, 2013

(65) Prior Publication Data

US 2015/0109903 A1 Apr. 23, 2015

(51) Int. Cl.
*H04L 12/24* (2006.01)

(52) U.S. Cl.
CPC ........ *H04L 41/0668* (2013.01); *H04L 41/0663* (2013.01); *H04L 41/5074* (2013.01)

(58) Field of Classification Search
CPC ............ H04L 41/0668; H04L 41/5074; H04L 41/0663
See application file for complete search history.

(56) References Cited

U.S. PATENT DOCUMENTS

| 2008/0133687 | A1* | 6/2008 | Fok et al. ....................... 709/207 |
| 2011/0066875 | A1* | 3/2011 | Fan et al. ...................... 714/4.11 |
| 2012/0042199 | A1* | 2/2012 | Chavez et al. ................ 714/4.21 |
| 2012/0239822 | A1* | 9/2012 | Poulson et al. ................ 709/239 |
| 2012/0257491 | A1* | 10/2012 | Mongeau et al. ............. 370/216 |
| 2013/0097330 | A1* | 4/2013 | Qiu et al. ....................... 709/228 |
| 2013/0155842 | A1* | 6/2013 | Moore et al. .................. 370/221 |
| 2014/0029411 | A1* | 1/2014 | Nayak et al. .................. 370/219 |
| 2014/0317440 | A1* | 10/2014 | Biermayr et al. ............. 714/4.11 |

* cited by examiner

*Primary Examiner* — Paul H Masur
*Assistant Examiner* — Kabir Jahangir

(57) ABSTRACT

A device determines a communication failure associated with a first network, and selects, based on the communication failure, a failover device from a list of failover devices. The device and the failover devices communicate via short-range communications, and the selected failover device connects to a second network. The device provides, to the selected failover device, a request to receive a service from the first network, and determines whether the selected failover device accepts the request. When the selected failover device accepts the request, the device establishes a communication channel with the selected failover device, and receives the service from the first network via the selected failover device, the communication channel, and the second network.

20 Claims, 30 Drawing Sheets

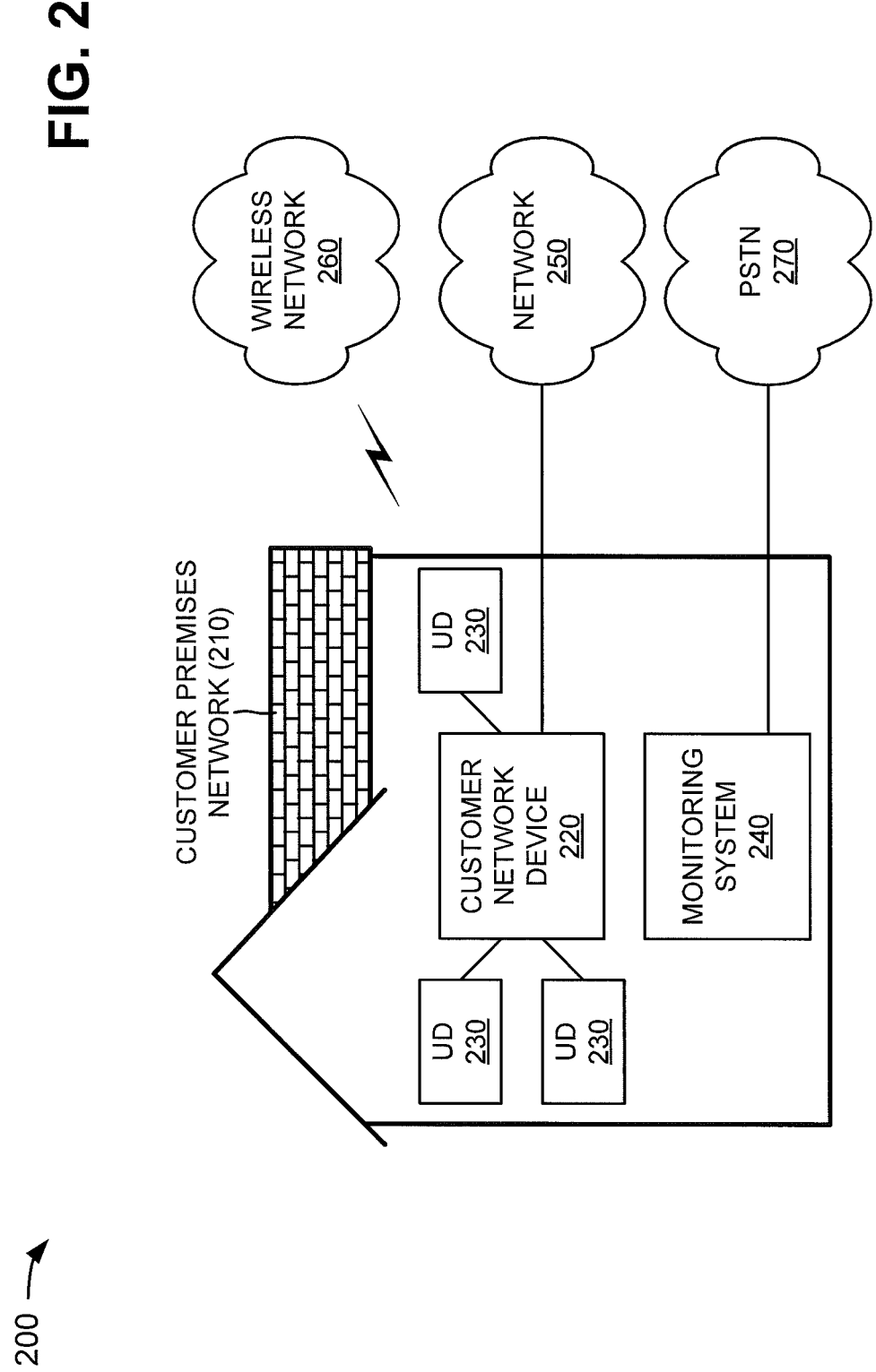

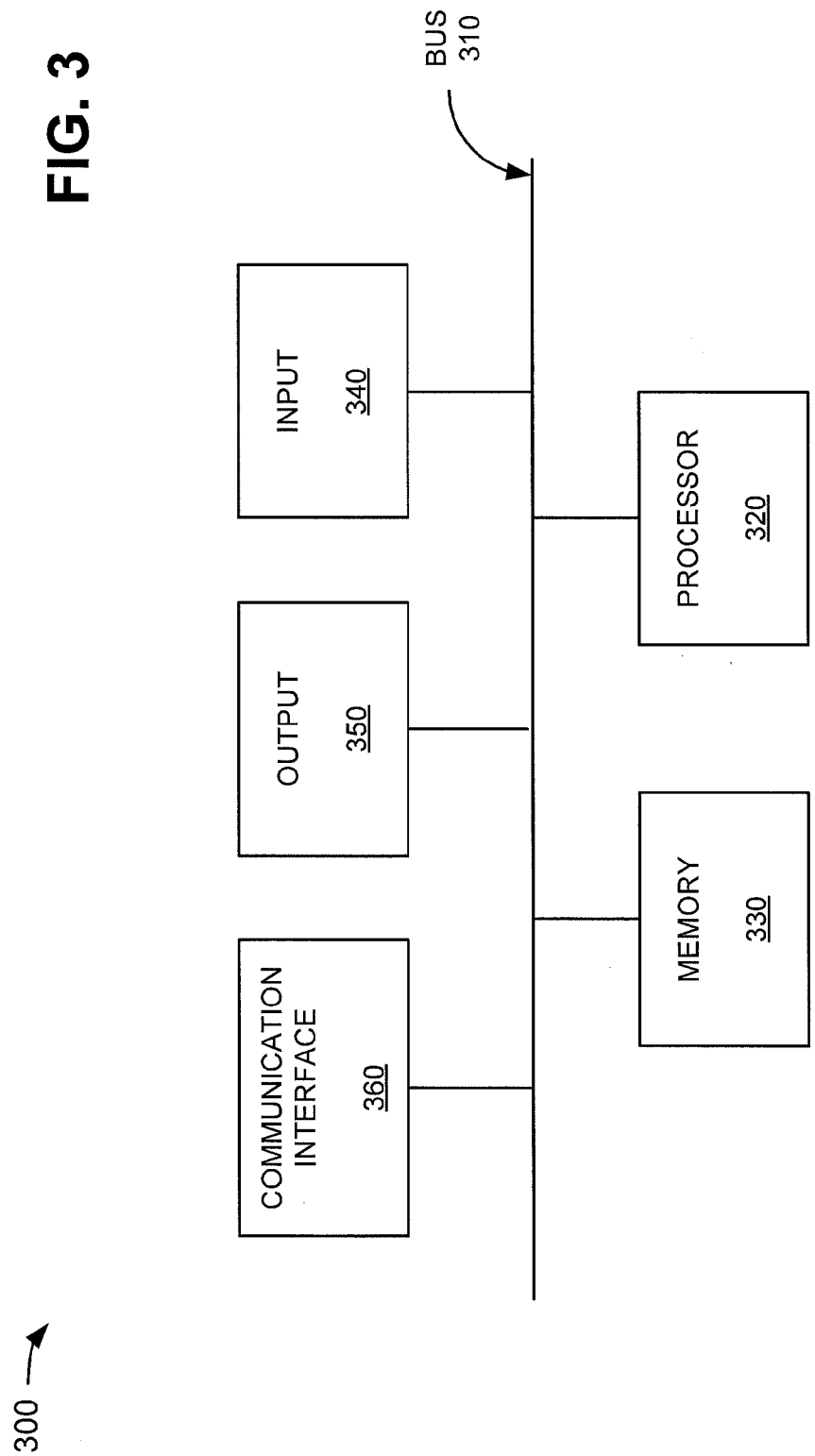

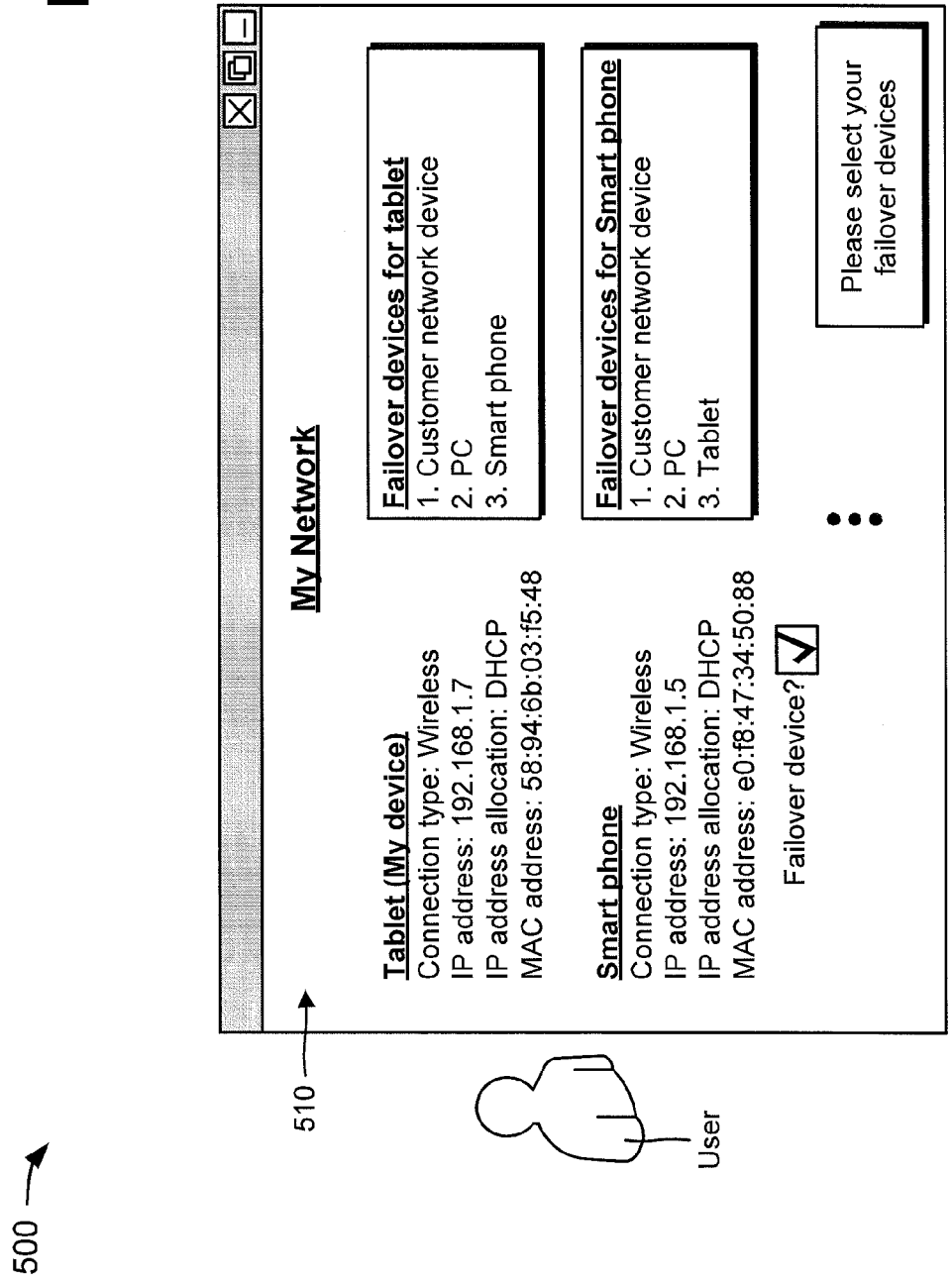

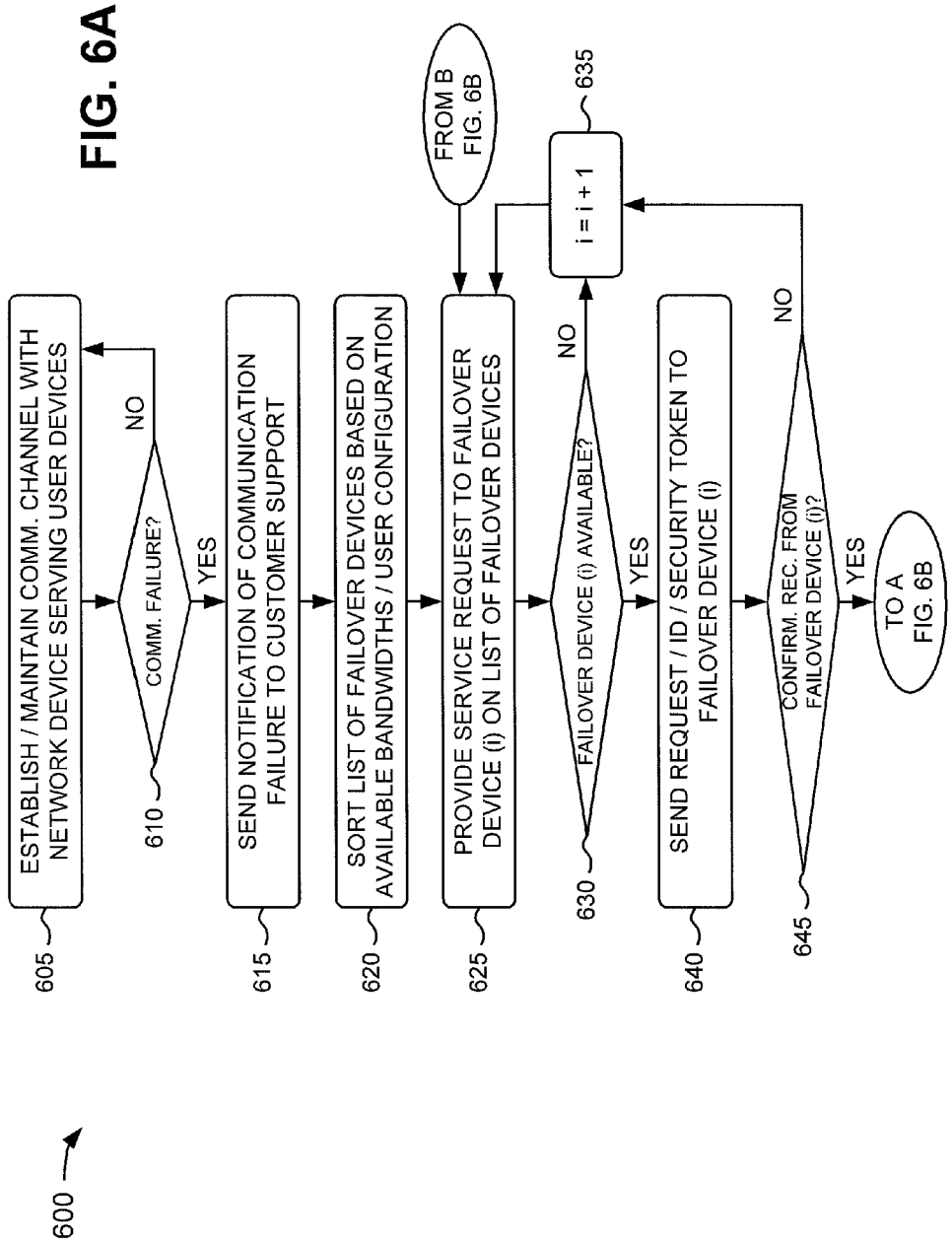

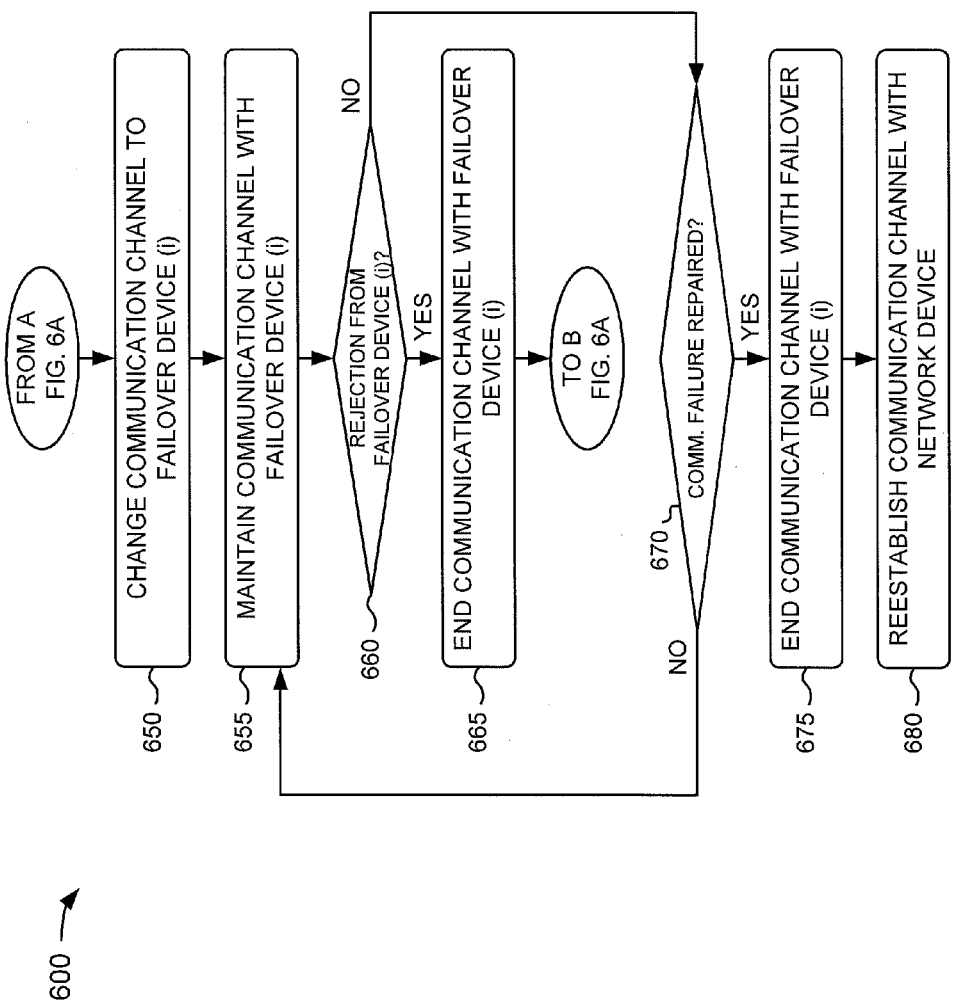

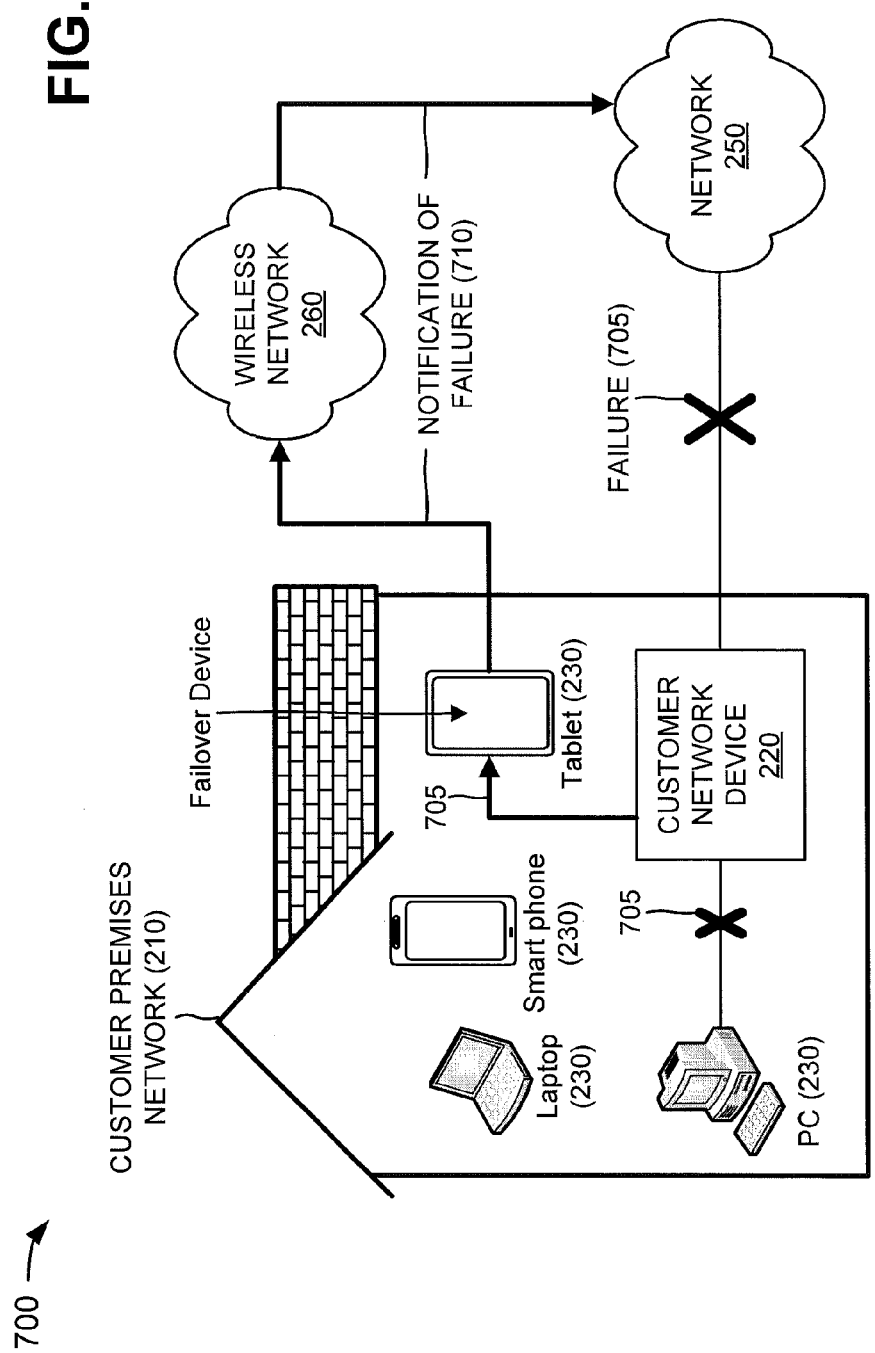

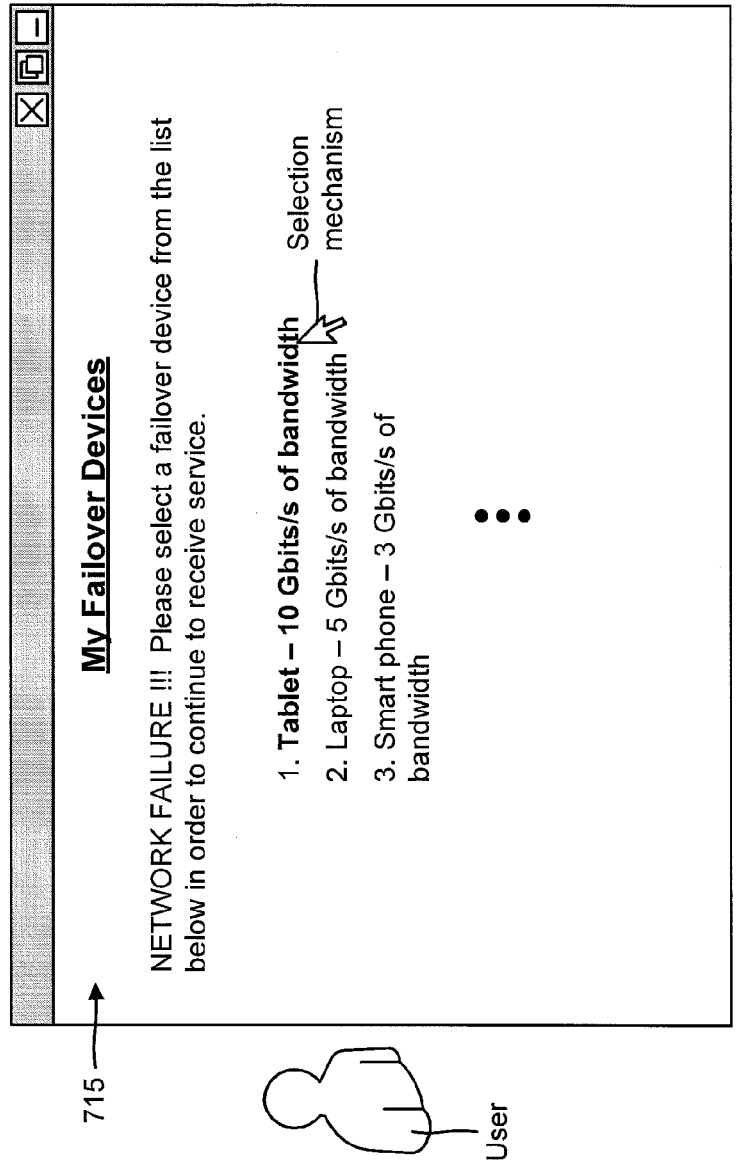

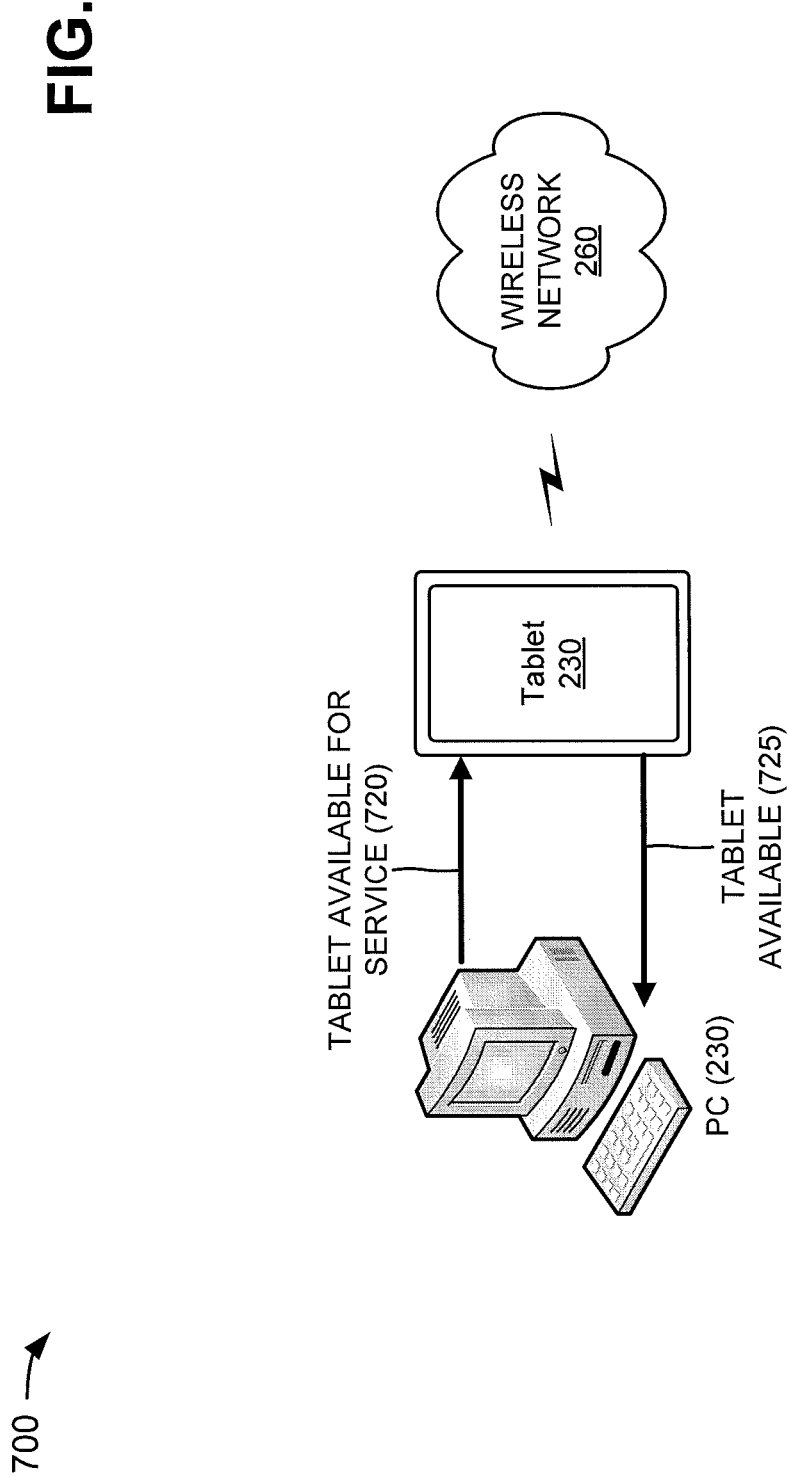

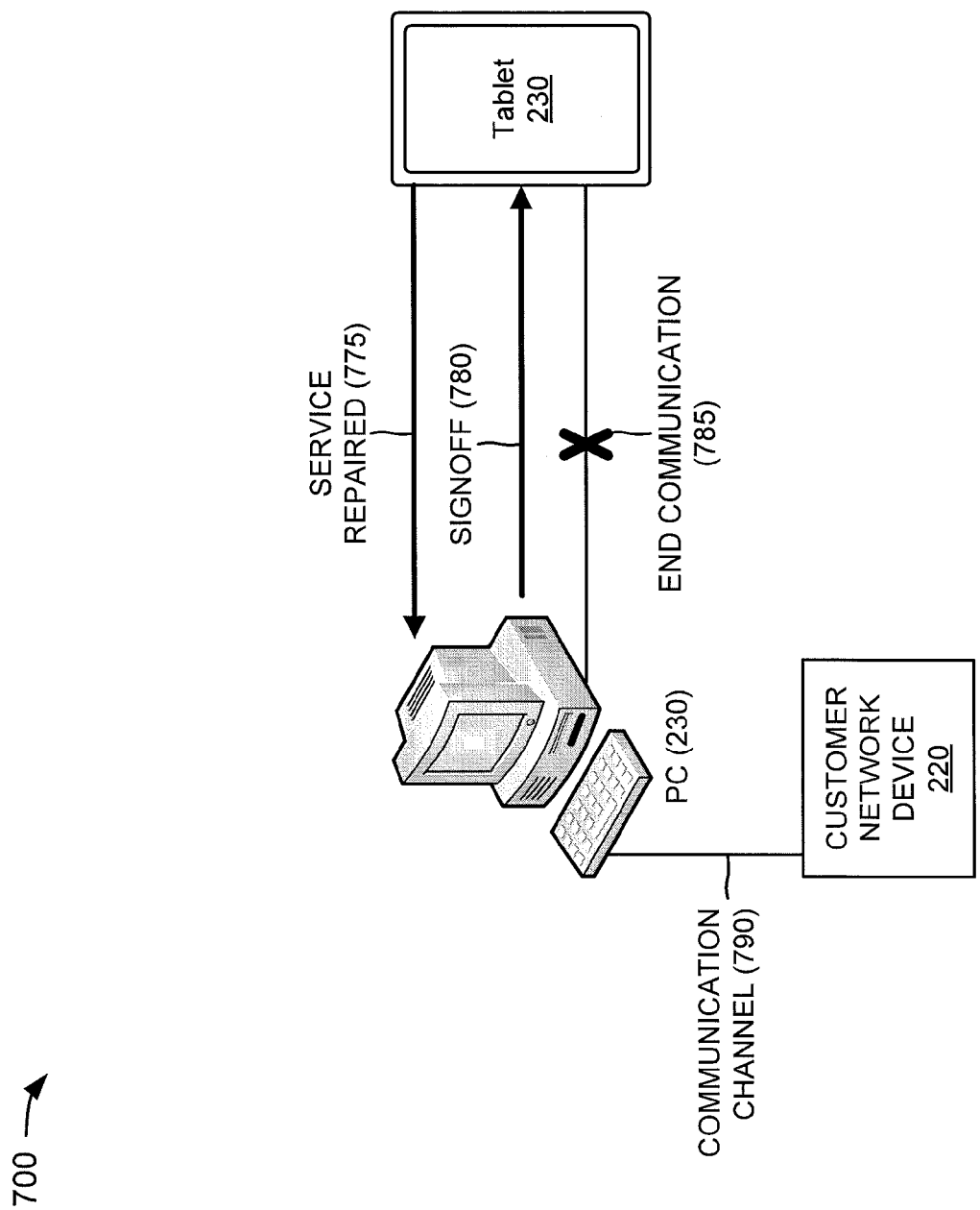

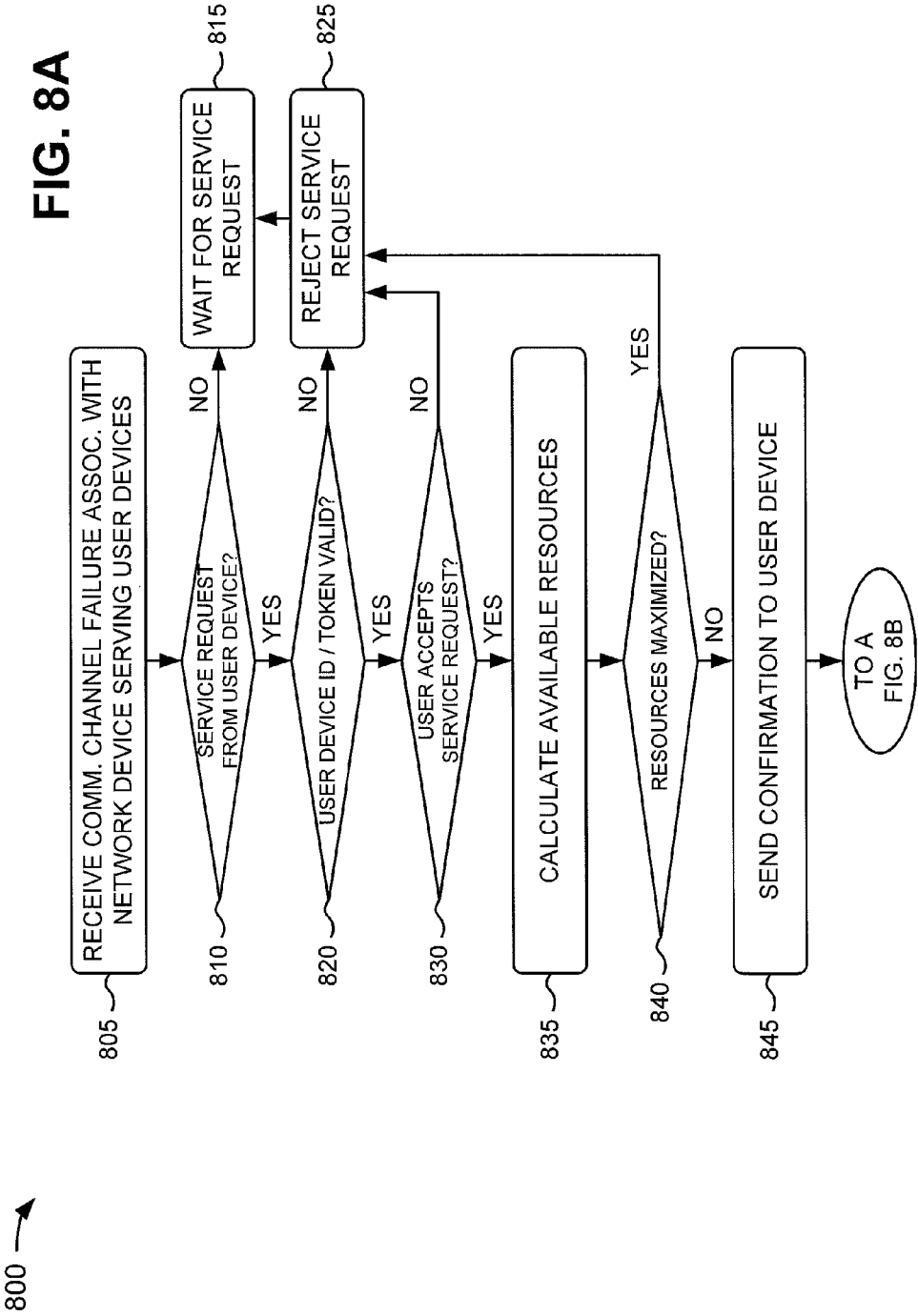

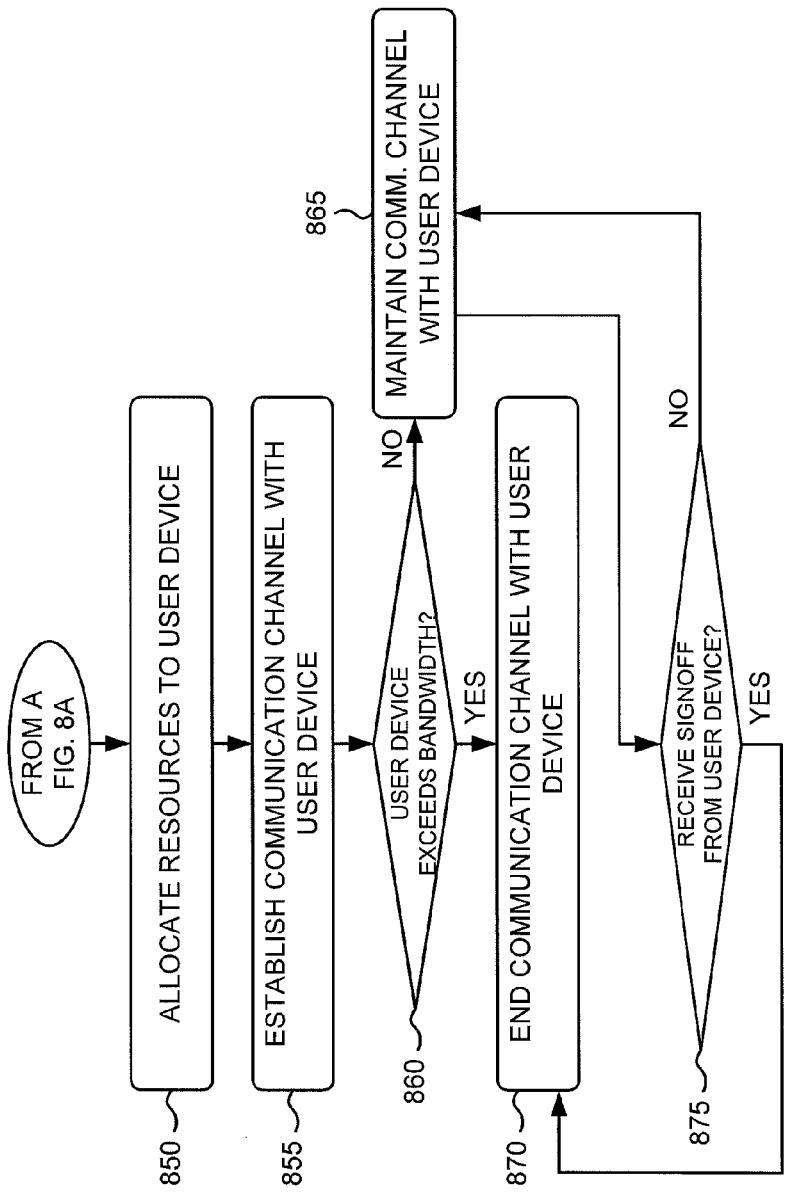

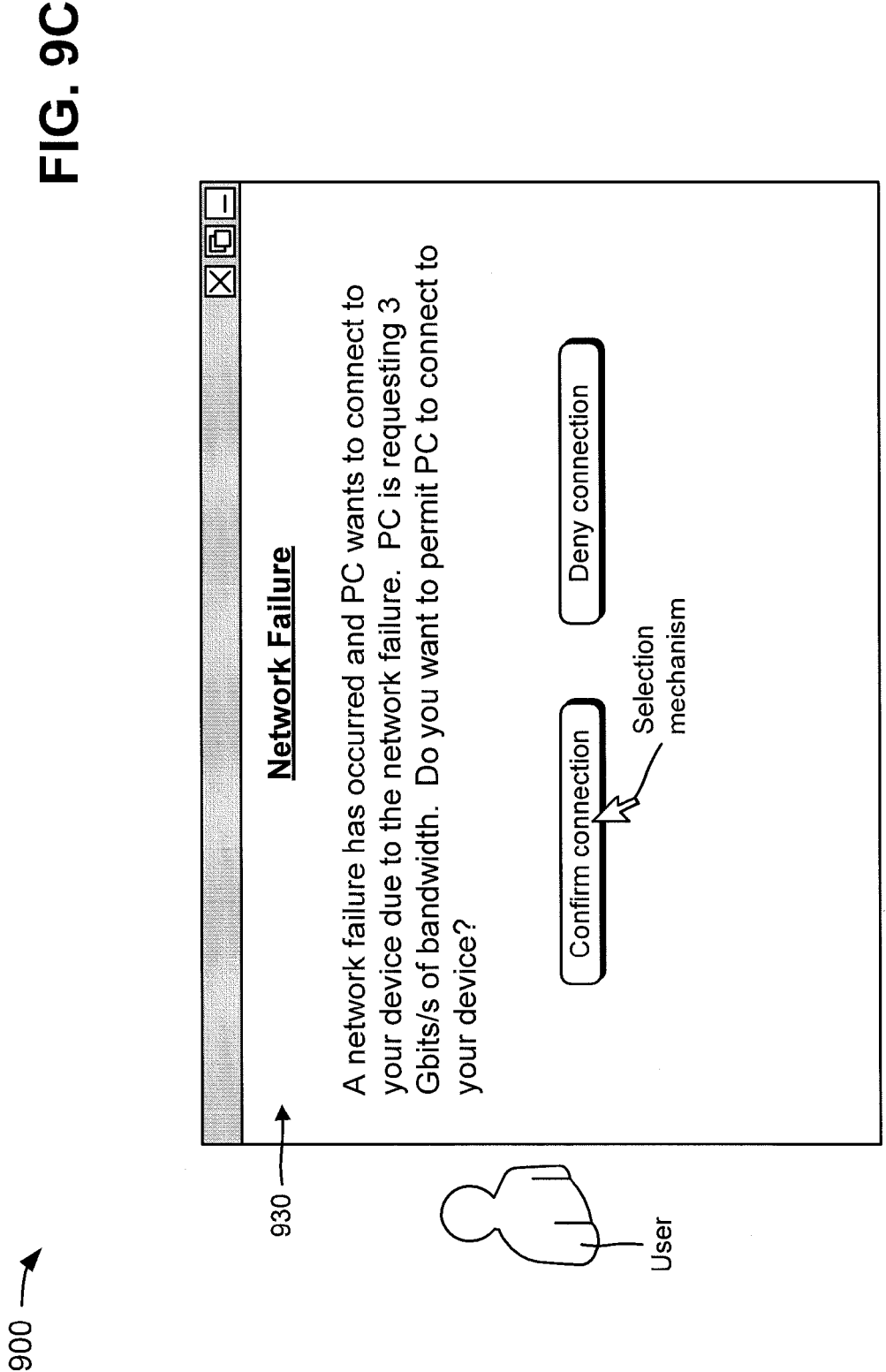

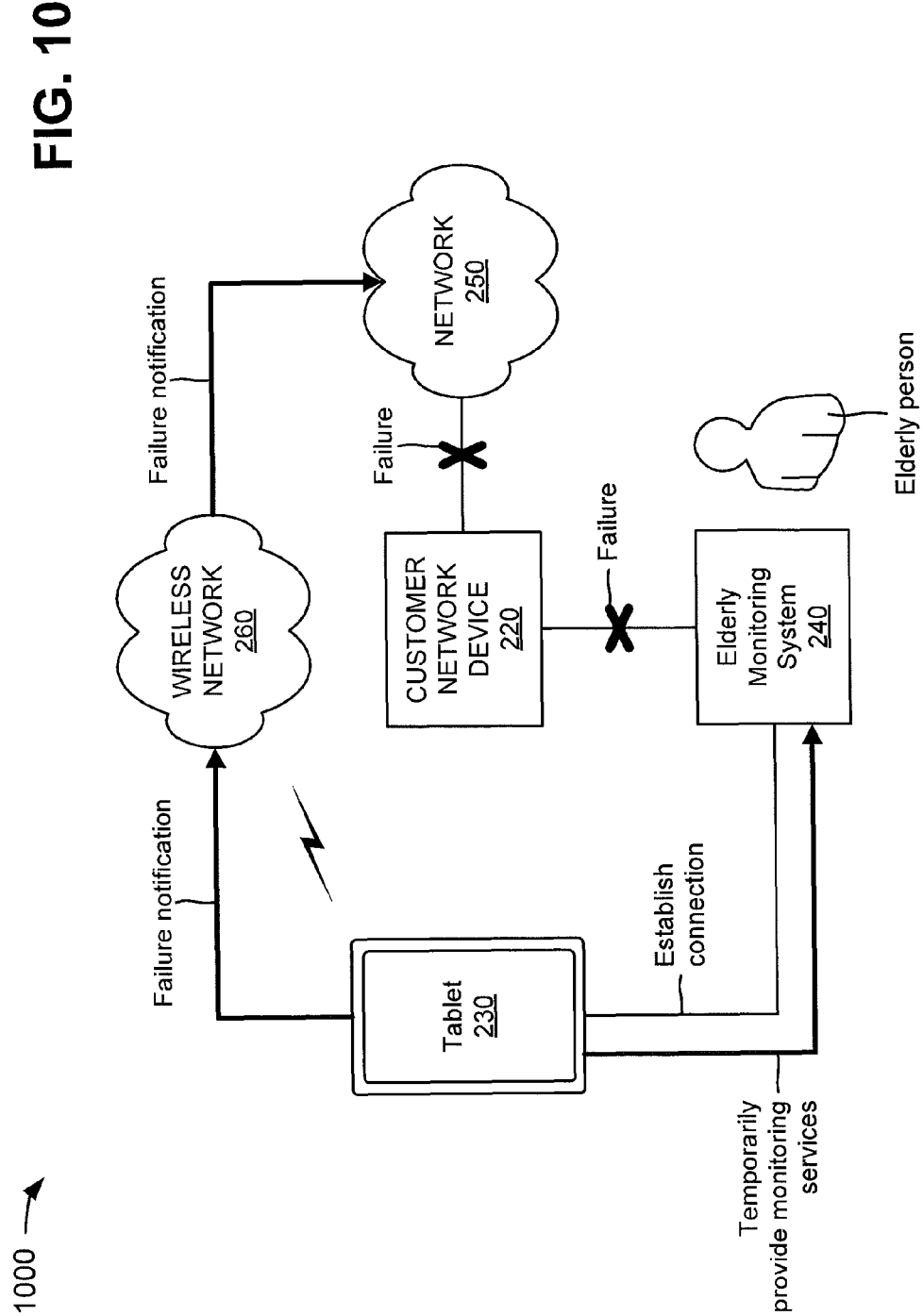

REDUNDANT COMMUNICATION FRAMEWORK

BACKGROUND

Bundled media services, such as combination packages of television, telephone, and broadband Internet services, have been successfully offered to customer premises with connections to wide area networks (WANs), such as service provider networks. A customer network device (also referred to as a home router, a residential gateway, a home gateway, etc.) provides an interface from the customer premises (e.g., a local area network (LAN)) to the service provider networks. Several user devices may be utilized by users in the customer premises, and may connect to the service provider networks via the customer network device. For example, personal computers, telephones, monitoring systems, laptop computers, smart phones, tablet computers, etc. may connect to the service provider network via the customer network device. Some user devices may also directly connect to wireless networks, telephone networks, such as the Public Switched Telephone Network (PSTN), etc., without utilizing the customer network device.

BRIEF DESCRIPTION OF THE DRAWINGS

FIG. 2 is a diagram of an example environment in which systems and/or methods described herein may be implemented;

FIG. 3 is a diagram of example components of a device that may correspond to one or more of the devices of the environment depicted in FIG. 2;

FIG. 4 is a flow chart of an example process for creating a list of failover devices that may be used during a network failure;

FIGS. 5A-5E are diagrams of an example relating to the example process shown in FIG. 4;

FIGS. 6A and 6B provide a flow chart of an example process for establishing a communication channel with a failover device during a network failure;

FIGS. 7A-7F are diagrams of an example relating to the example process shown in FIGS. 6A and 6B;

FIGS. 8A and 8B provide a flow chart of an example process for providing failover device services during a network failure;

FIGS. 9A-9F are diagrams of an example relating to the example process shown in FIGS. 8A and 8B; and FIGS. 10-12 are diagrams of example use cases associated with systems and/or methods described herein.

DETAILED DESCRIPTION OF PREFERRED EMBODIMENTS

The following detailed description refers to the accompanying drawings. The same reference numbers in different drawings may identify the same or similar elements.

Customers or users may experience connectivity problems to service provider networks for a variety of reasons, such as, for example, equipment failures, configuration failures, software failures, user error, etc. Network connectivity provided by a customer network device to a WAN may fail for a variety of reasons. For example, software failures, hardware failures, etc. associated with the customer network device may cause a network connectivity failure. Network connectivity failure may be frustrating for the users associated with the customer premises. For example, if the customer network device experiences a connectivity failure, all user devices (e.g., a home security system, an elderly monitoring system, a laptop computer, a personal computer, a tablet computer, etc.) connected to the customer network device may not receive services from the service provider networks.

Figure 1A:
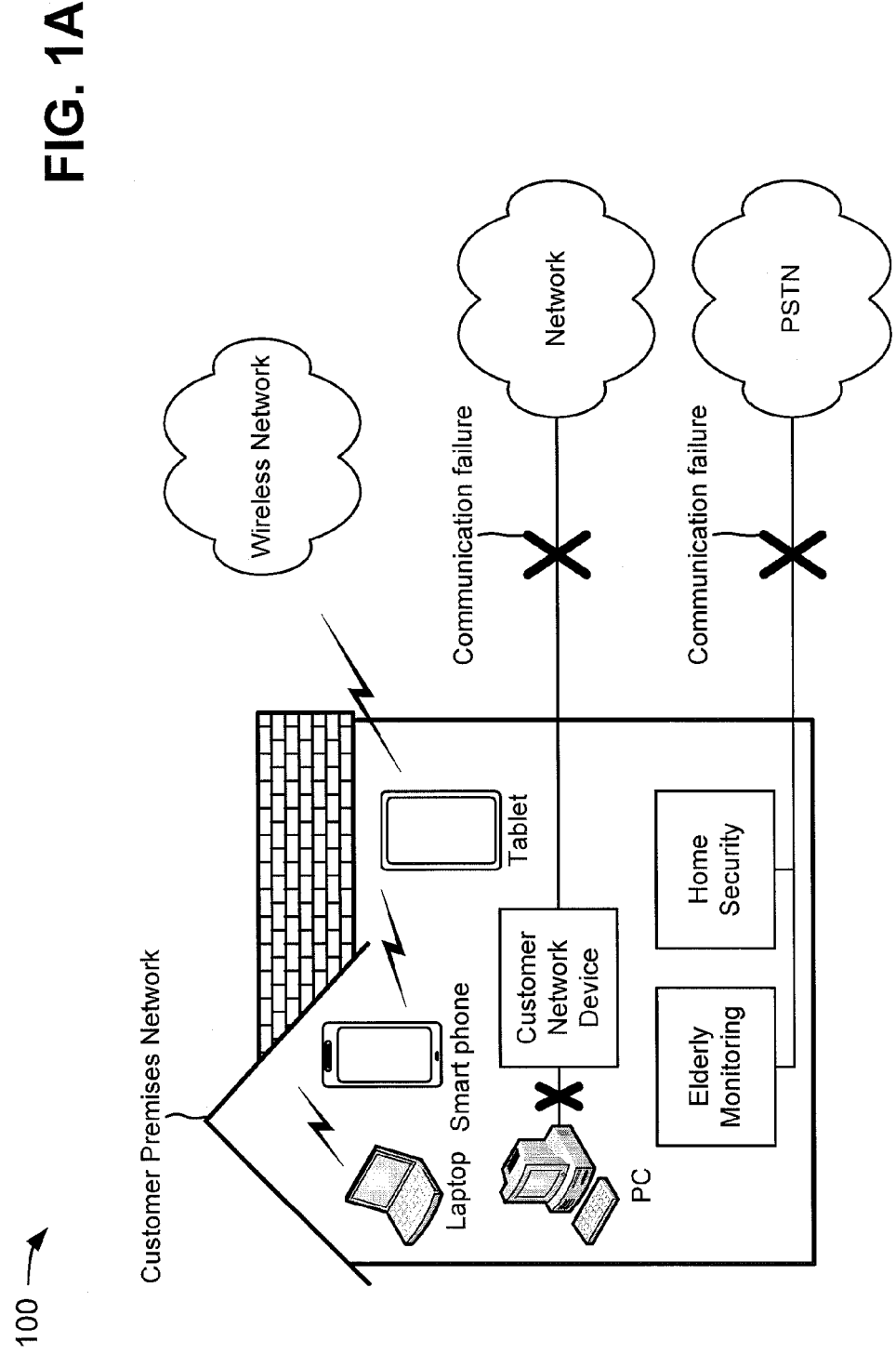
FIGS. 1A-1C are diagrams of an overview of an example implementation described herein.
Figure 1B:
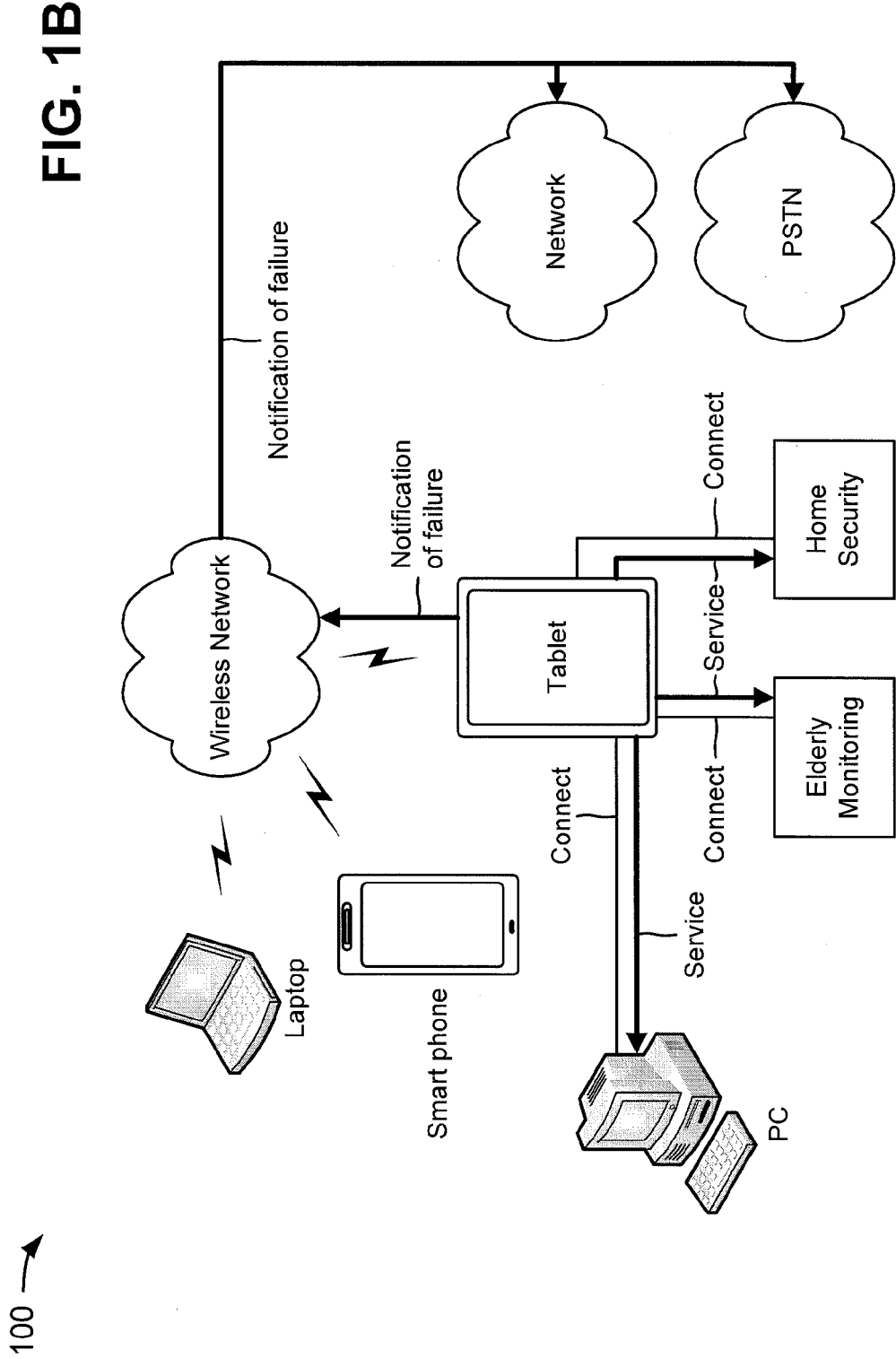
Figure 1C:
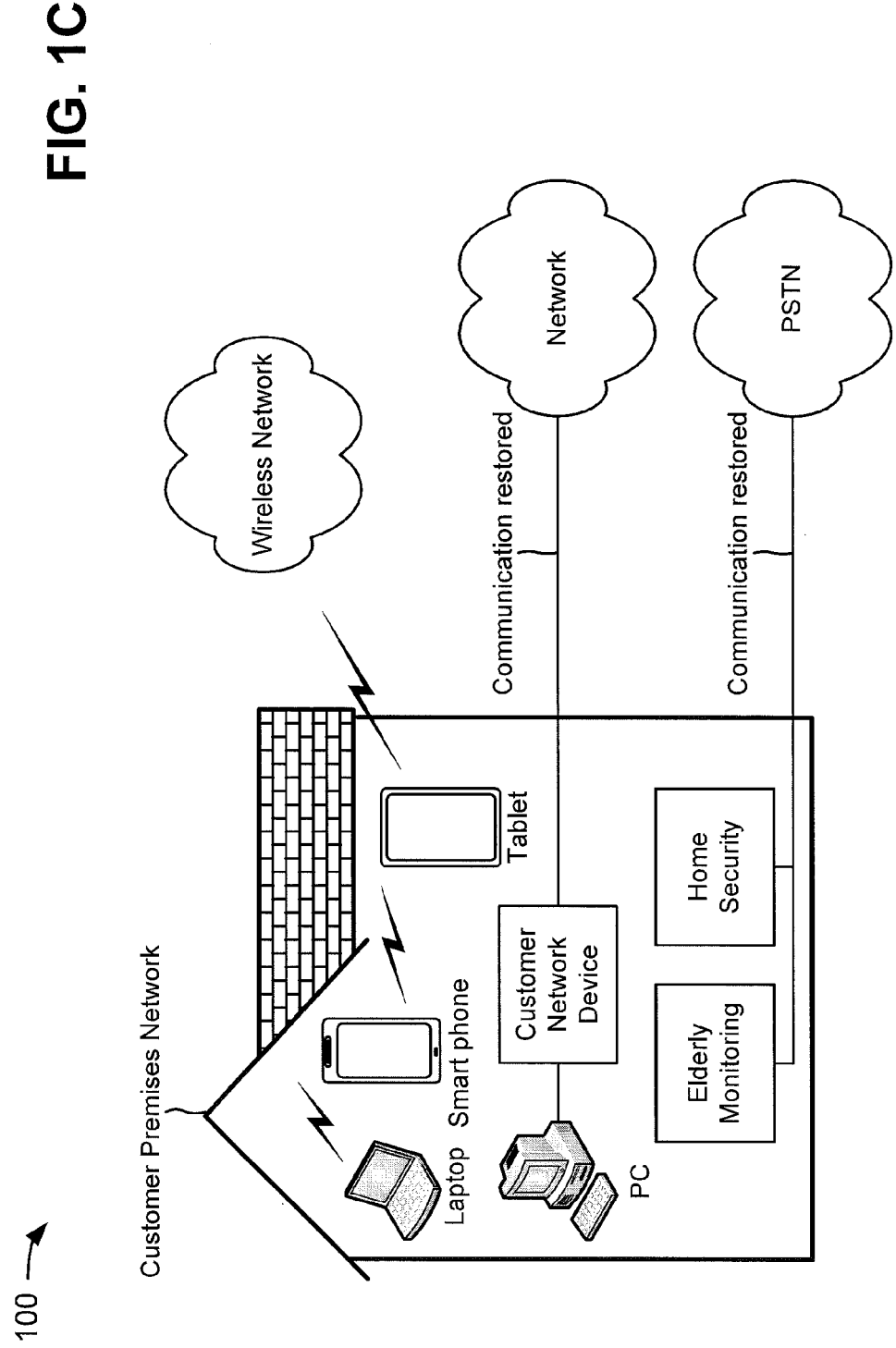

FIGS. 1A-1C are diagrams of an overview of an example implementation 100 described herein. As shown in FIG. 1A, a customer premises network may include one or more devices connected to each other to form a LAN. The devices in the customer premises network may include, for example, user devices (e.g., a laptop computer, a smart phone, a tablet computer, a personal computer (PC), a set-top box (STB), a television, etc.) and home networking equipment (e.g., a customer network device, cables, splitters, local gateways, etc.). The customer network device may provide connectivity between the user devices and between the user devices and an external network. Some of the user devices, such as the laptop computer, the smart phone, and the tablet computer, may connect to a wireless network without utilizing the customer network device. As further shown in FIG. 1A, the customer premises network may include monitoring systems, such as an elderly monitoring system and a home security system, that connect to the external network, via the customer network device, or to other networks (e.g., a PSTN).

In some implementations, one or more of the user devices may be designated as failover devices in the event that the customer network device loses connectivity to the external network. A failover device may include a device that provides connectivity to a service provider when the customer network device loses connectivity to the external network. In example implementation 100, assume that the tablet computer has been designated as a failover device. Further, assume that the customer network device experiences a communication failure with the external network (e.g., due to a power outage), and that the monitoring systems experience a communication failure with the PSTN, as further shown in FIG. 1A.

When the communication failures occur, the tablet computer, the smart phone, and the laptop computer may continue to connect with the wireless network, as shown in FIG. 1B. The tablet computer may receive requests to connect from the personal computer, the elderly monitoring system, and the home security system since these devices/systems are no longer connected to the external network and/or the PSTN. The tablet computer may establish connections with the personal computer, the elderly monitoring system, and the home security system, and may temporarily provide service to the personal computer, the elderly monitoring system, and the home security system, as further shown in FIG. 1B. For example, the personal computer may access the Internet via the tablet computer and the wireless network. The elderly monitoring system and the home security system may access service providers (e.g., emergency service personnel) associated with the systems via the tablet computer and the wireless network.

As further shown in FIG. 1B, the tablet computer may generate a notification of the communication failures, and may provide the notification to service providers associated with the external network and the PSTN. Based on the notification, assume that the service providers eventually correct the communication failures, and restore communication with the customer network device, the elderly monitoring system, and the home security system, as shown in FIG. 1C. When communication is restored with the customer network device, the elderly monitoring system, and the home security system, the tablet computer may terminate the connections with the customer network device, the elderly monitoring system, and the home security system.

Such an arrangement may provide a redundant communication network for the user devices and/or the monitoring systems of the customer premises. The user devices and/or the monitoring systems may designate failover devices for the customer premises, and may utilize one or more failover devices to send and/or receive traffic (e.g., monitoring system information, emergency data, notifications, etc.) in the event of a communication failure in the customer premises. The failover device may configure priorities for outgoing and/or incoming traffic provided by the user devices and/or the monitoring systems, and may control bandwidth usage by the user devices and/or the monitoring systems.

FIG. 2 is a diagram of an example environment 200 in which systems and/or methods described herein may be implemented. As illustrated, environment 200 may include a customer premises network 210, with a customer network device 220, one or more user devices 230, and a monitoring system 240; a network 250; a wireless network 260; and a PSTN 270. Devices/networks of environment 200 may connect via wired connections, wireless connections, or a combination of wired and wireless connections.

Customer premises network 210 may include one or more devices connected to each other. The devices in customer premises network 210 may include, for example, customer network device 220, user devices 230, and monitoring system 240. In some implementations, the devices within customer premises network 210 may be connected via wired connections (e.g., coaxial cable, Telecommunications Industry Association category 5 ("cat 5") cable, etc.) or wireless connections (e.g., using network devices such as those available under the IEEE 802.11 wireless LAN standards) to form a LAN.

Customer network device 220 may include a multi-function networking device that combines the functions of a Digital Subscriber Line (DSL) or cable modem, a firewall, a router, a network switch, and/or a wireless access point into a single device. In some implementations, customer network device 220 may provide connectivity between equipment within customer premises network 210 (e.g. user devices 230 and/or monitoring system 240) and between the customer premises equipment and an external network (e.g., network 250). In some implementations, customer network device 220 may employ one or more short-range wireless communication protocols for a wireless personal area network (WPAN) and/or a wireless local area network (WLAN), such as, for example, IEEE 802.15 (e.g., Bluetooth), IEEE 802.11 (e.g., Wi-Fi), near-field communication (NFC), etc. In some implementations, customer network device 220 may include one or more wired (e.g., Ethernet) connections.

User device 230 may include a device that is capable of communicating with other user devices 230, monitoring system 240, and/or network 250, via customer network device 220. In some implementations, user device 230 may include a device that is capable of communicating with wireless network 260 without utilizing customer network device 220. In some implementations, user device 230 may include a device that is capable of communicating with other user devices 230 and/or monitoring system 240 via one or more short-range wireless communication protocols for a WPAN and/or a WLAN. In some implementations, user device 230 may include software that permits user device 230 to function as a failover device and/or to utilize failover devices. In some implementations, user device 230 may include a radiotelephone; a PCS terminal that may combine, for example, a cellular radiotelephone with data processing and data communications capabilities; a smart phone; a personal digital assistant (PDA) that can include a radiotelephone, a pager, Internet/intranet access, etc.; a laptop computer, a tablet computer; a STB; a television; or another type of computation and communication device.

Monitoring system 240 may include one or more personal computers, workstation computers, monitoring devices, or other types of computation and communication devices. In some implementations, monitoring system 240 may include one or more devices capable of being controlled and/or providing information associated with an area to be controlled (e.g., a home). For example, monitoring system 240 may include devices provided in electrical systems (e.g., light switches, lights, televisions, radios, gas detectors, motion detectors, etc.), devices provided in mechanical systems (e.g., windows, doors, door locks, etc.), devices provided in communication systems (e.g., smoke detectors, surveillance cameras, etc.), devices provided in entertainment systems (e.g., televisions, home theater systems, stereos, etc.), personal monitoring devices (e.g., heart rate monitors, blood pressure monitors, etc.), etc. In some implementations, monitoring system 240 may include software that permits monitoring system 240 to function as a failover device and/or to utilize failover devices.

Network 250 may include a network, such as a local area network (LAN), a wide area network (WAN), a metropolitan area network (MAN), a telephone network, such as the PSTN, a cellular network, an intranet, the Internet, or a combination of networks.

Wireless network 260 may include a communications network that connects subscribers (e.g., user devices 230) to a service provider. In some implementations, wireless network 260 may include a wireless local area network (WLAN) or other access networks, such as, for example, an evolved universal terrestrial radio access network (E-UTRAN) or an enhanced high-rate packet data (eHRPD) network. In some implementations, wireless network 260 may include a radio access network that is separate from network 250.

PSTN 270 may include an aggregate of circuit-switched telephone networks that provide infrastructure and services for public telecommunication. In some implementations, PSTN 270 may include telephone lines, fiber optic cables, microwave transmission links, cellular networks, communications satellites, telephone cables, etc. that are interconnected by switching centers. In some implementations, PSTN 270 may include a network that is separate from network 250.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementation, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for creating a list of failover devices that may be used during a network failure. In some implementations, one or more process blocks of FIG. 4 may be performed by user device 230 and/or monitoring system 240. In some implementations, one or more process blocks of FIG. 4 may be performed by another device or a group of devices separate from or including user device 230 and/or monitoring system 240. Process 400 will be described in terms of user device 230 but may be performed by monitoring system 240.

As shown in FIG. 4, process 400 may include receiving information associated with other user devices of a network (block 410). For example, user devices 230 and monitoring system 240 may be part of customer premises network 210 and may communicate with customer network device 220. In some implementations, user devices 230 and monitoring system 240 may communicate with each other via customer network device 220 or may directly communicate with each other via short-range wireless communication protocols. In some implementations, user devices 230 and monitoring system 240 may share information associated with user devices 230 and/or monitoring system 240. The information may include, for example, connection types, Internet protocol (IP) addresses, failover devices, etc. associated with user devices 230 and/or monitoring system 240. In some implementations, each user device 230 may receive the information associated with other user devices 230 and/or monitoring system 240.

As further shown in FIG. 4, process 400 may include presenting the information associated with the other user devices for display to a user (block 420). For example, a particular user device 230 may be associated with a user. In some implementations, the particular user device 230 may display the information associated with other user devices 230 and/or monitoring system 240 to the user. For example, the particular user device 230 may display information regarding the connection types, the IP addresses, the failover devices, etc. associated with the other user devices 230 and/or monitoring system 240 to the user via a user interface.

As further shown in FIG. 4, process 400 may include receiving a user designation of the other user devices as failover devices (block 430). For example, the user of the particular user device 230 may designate one or more of the other user devices 230 as failover devices for the particular user device 230. In some implementations, the user may utilize the user interface, displaying the information associated with other user devices 230 and/or monitoring system 240, to select one or more of the other user devices 230 as failover devices for the particular user device 230. In some implementations, the particular user device 230 may store (e.g., in memory 330, FIG. 3) the designation(s) of the other user device(s) 230 as failover device(s).

In some implementations, the particular user device 230 may automatically designate one or more of the other user devices 230 as failover devices based on bandwidth associated with the other user devices 230. For example, the particular user device 230 may designate other user devices 230, with a bandwidth that exceeds a particular threshold (e.g., in bits, megabits (Mb), gigabits (Gb), etc. per second, minute, hour, etc.), as failover devices. In some implementations, the particular user device 230 may automatically designate one or more of the other user devices 230 as failover devices based on incoming and outgoing traffic priorities (e.g., allocate X bits for incoming traffic and Y bits for outgoing traffic) associated with the other user devices 230. For example, the particular user device 230 may designate other user devices 230, with incoming/outgoing traffic priorities that exceed a particular threshold (e.g., in bits, megabits, gigabits, etc.), as failover devices.

As further shown in FIG. 4, process 400 may include creating a list of failover devices based on the user designation (block 440). For example, the particular user device 230 may create a list of failover devices based on the user's designations of one or more other user devices 230 as failover devices for the particular user device 230. In some implementations, the list of failover devices may include information identifying the one or more other user devices 230 designated by the user. In some implementations, the particular user device 230 may store (e.g., in memory 330, FIG. 3) the list of failover devices. In some implementations, the particular user device 230 may create the list of failover devices when instructed by the user or automatically after the user designates the one or more other user devices 230 as failover devices.

In some implementations, the particular user device 230 may automatically order the list of failover devices based on the bandwidths available via the failover devices. For example, the particular user device 230 may arrange the list of failover devices in descending order based on the bandwidths (e.g., where the failover device with the greatest available bandwidth is first, the failover over device the next greatest available bandwidth is second, etc.). In another example, the particular user device 230 may arrange the list of failover devices in ascending order based on the bandwidths (e.g., where the failover device with the smallest available bandwidth is first, the failover over device the next smallest available bandwidth is second, etc.).

In some implementations, the particular user device 230 may automatically order the list of failover devices based on the incoming/outgoing traffic priorities associated with the failover devices. For example, the particular user device 230 may arrange the list of failover devices in descending order based on the incoming/outgoing traffic priorities (e.g., where the failover device with the greatest incoming/outgoing traffic priorities is first, the failover device with the next greatest incoming/outgoing traffic priorities is second, etc.). In another example, the particular user device 230 may arrange the list of failover devices in ascending order based on the incoming/outgoing traffic priorities (e.g., where the failover device with the smallest incoming/outgoing traffic priorities is first, the failover device with the next smallest incoming/outgoing traffic priorities is second, etc.).

As further shown in FIG. 4, process 400 may include receiving a user configuration of priorities for incoming/outgoing traffic (block 450). For example, the user of the particular user device 230 may provide a configuration of incoming/outgoing traffic priorities associated with the failover devices and/or the particular user device 230. In some implementations, the user configuration of incoming/outgoing traffic priorities may include the user's desired amount of bits, megabits, gigabits, etc. for incoming traffic and for outgoing traffic associated with the particular user device 230. For example, the user may desire that particular user device 230 utilize no more than Z bits for incoming traffic and W bits for outgoing traffic. In some implementations, the user may provide, with the user configuration incoming/outgoing traffic priorities, a desired minimum bandwidth for the particular user device 230.

As further shown in FIG. 4, process 400 may include ordering the list of failover devices based on the user configuration (block 460). For example, the particular user device 230 may order the list of failover devices based on the user configuration of incoming/outgoing traffic priorities. In some implementations, the particular user device 230 may store (e.g., in memory 330, FIG. 3) the ordered list of failover devices. In some implementations, the particular user device 230 may order the list of failover devices when instructed by the user or automatically after the user provides the user configuration of incoming/outgoing traffic priorities.

In some implementations, the particular user device 230 may arrange the list of failover devices in descending order based on the incoming/outgoing traffic priorities (e.g., where the failover device with the greatest incoming/outgoing traffic priorities is first, the failover over device the next greatest incoming/outgoing traffic priority is second, etc.). In some implementations, the particular user device 230 may arrange the list of failover devices in ascending order based on the incoming/outgoing traffic priorities. In some implementations, the particular user device 230 may order the list of failover devices based on other parameters, such as, for example, the bandwidths associated with the failover devices.

As further shown in FIG. 4, process 400 may include presenting the list of failover devices for display to the user (block 470). For example, the particular user device 230 may display the ordered list of failover devices to the user via a user interface. In some implementations, the user interface may display information associated with the failover devices, such as failover device identifiers, failover device names, failover device manufacturers and/or models, users associated with the failover devices, etc. For example, the ordered list of failover devices may include the following information: "1. Personal computer (Fred), 2. Tablet computer (Joan), 3. Smart phone (Mine), 4. Personal computer (Office), etc."

As further shown in FIG. 4, process 400 may include receiving a change to the order of the list of failover devices from the user (block 480). For example, the user may utilize the particular user device 230 to change the order of the list of failover devices. In some implementations, the user may utilize the user interface, displaying the list of failover devices, to change the order of the list. For example, the user may utilize a selection mechanism (e.g., a mouse) to move one or more failover device names from one location to another location in the list of failover devices.

As further shown in FIG. 4, process 400 may include modifying the order of the list of failover devices based on the change (block 490). For example, the particular user device 230 may modify the order of the list of failover devices based on the change received from the user. In some implementations, the particular user device 230 may store (e.g., in memory 330, FIG. 3) and/or display the modified list of failover devices. In some implementations, the particular user device 230 may modify the order of the list of failover devices when instructed by the user or automatically after the user provides the change to the order of the list of failover devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5B:
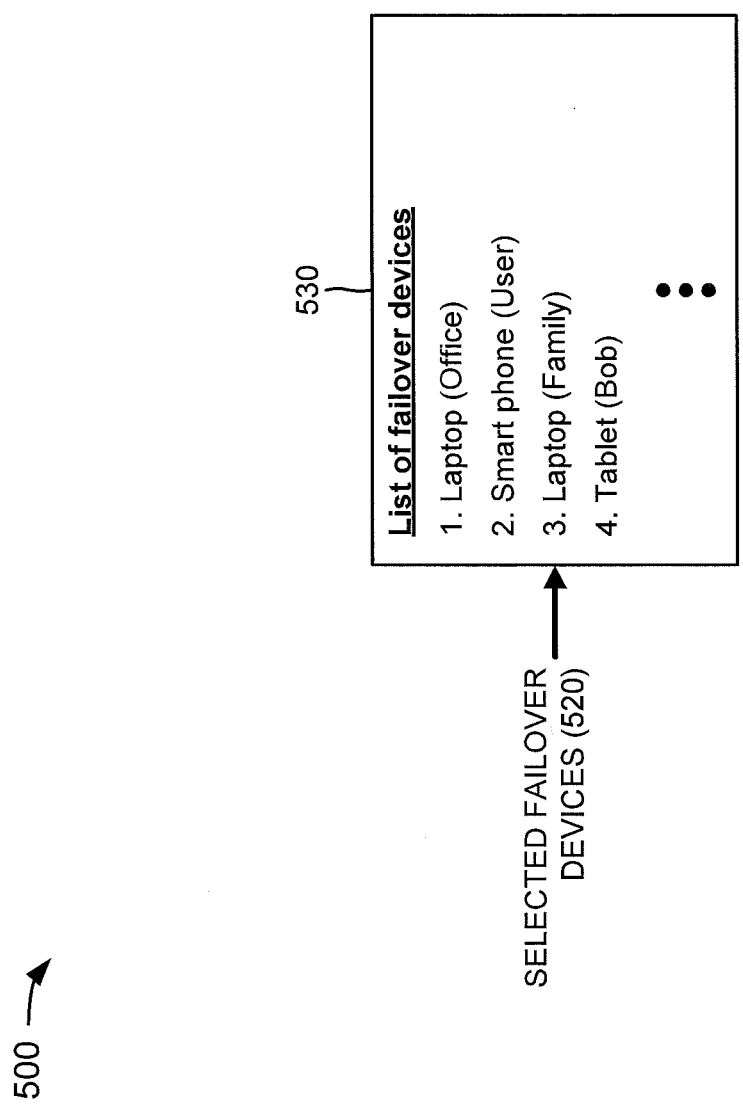

FIGS. 5A-5E are diagrams of an example 500 relating to example process 400 shown in FIG. 4. In example 500, assume that a user is associated with the particular user device 230 (e.g., tablet computer 230) provided in customer premises network 210. Further, assume that the user utilizes tablet computer 230 to access information associated with customer premises network 210, and that tablet computer 230 displays a user interface 510 to the user, as shown in FIG. 5A. User interface 510 may include information associated with customer premises network 210, such as, for example, a listing of user devices 230 provided in customer premises network 210. For example, user interface 510 may include a name of the user's tablet computer 230 (e.g., Tablet); information associated with tablet computer 230 (e.g., a connection type, an IP address, an IP address allocation, a media access control (MAC) address, etc.); and failover devices associated with tablet computer 230 (e.g., a customer network device, a PC, a smart phone, etc.). User interface 510 may include a name of a smart phone 230 (e.g., Smart phone); information associated with smart phone 230; and failover devices associated with smart phone 230 (e.g., a customer network device, a PC, a tablet, etc.).

As further shown in FIG. 5A, user interface 510 may request that the user select failover devices from the listing of user devices 230. The user may select failover devices by selecting a mechanism (e.g., a checkbox, a link, etc.) associated with the failover devices. As shown in FIG. 5A, the user may select smart phone 230 from the listing of user devices 230. After the user selects the failover devices from user interface 510, the particular user device 230 may create a list 530 of failover devices based on the user's selected failover devices 520, as shown in FIG. 5B. As shown, list 530 of failover devices may include a laptop computer associated with a home office, Laptop (Office), a smart phone associated with the user, Smart phone (User), a laptop computer associated with a family of the user, Laptop (Family), and a tablet computer associated with Bob, Tablet (Bob). In some implementations, tablet computer 230 may automatically order list 530 based on, for example, bandwidth availability of the failover devices.

Figure 5C:
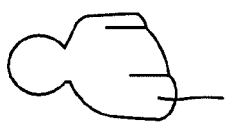

Now assume that the user utilizes tablet computer 230 to access information associated with traffic use by tablet computer 230, and that tablet computer 230 displays a user interface 540 to the user, as shown in FIG. 5C. User interface 540 may request that the user specify information for outgoing and incoming traffic, for tablet computer 230, in the event of a network failure (e.g., in customer premises network 210). For example, user interface 540 may request a required bandwidth during a network failure for outgoing traffic from tablet computer 230 and incoming traffic to tablet computer 230. User interface 540 may also require that the user specify whether video services and/or data services are needed by tablet computer 230, for outgoing and incoming traffic, during a network failure. After the user provides the information requested by user interface 540, the user may select a mechanism (e.g., a Confirm information button, icon, link, etc.) to confirm the provided information.

Figure 5D:
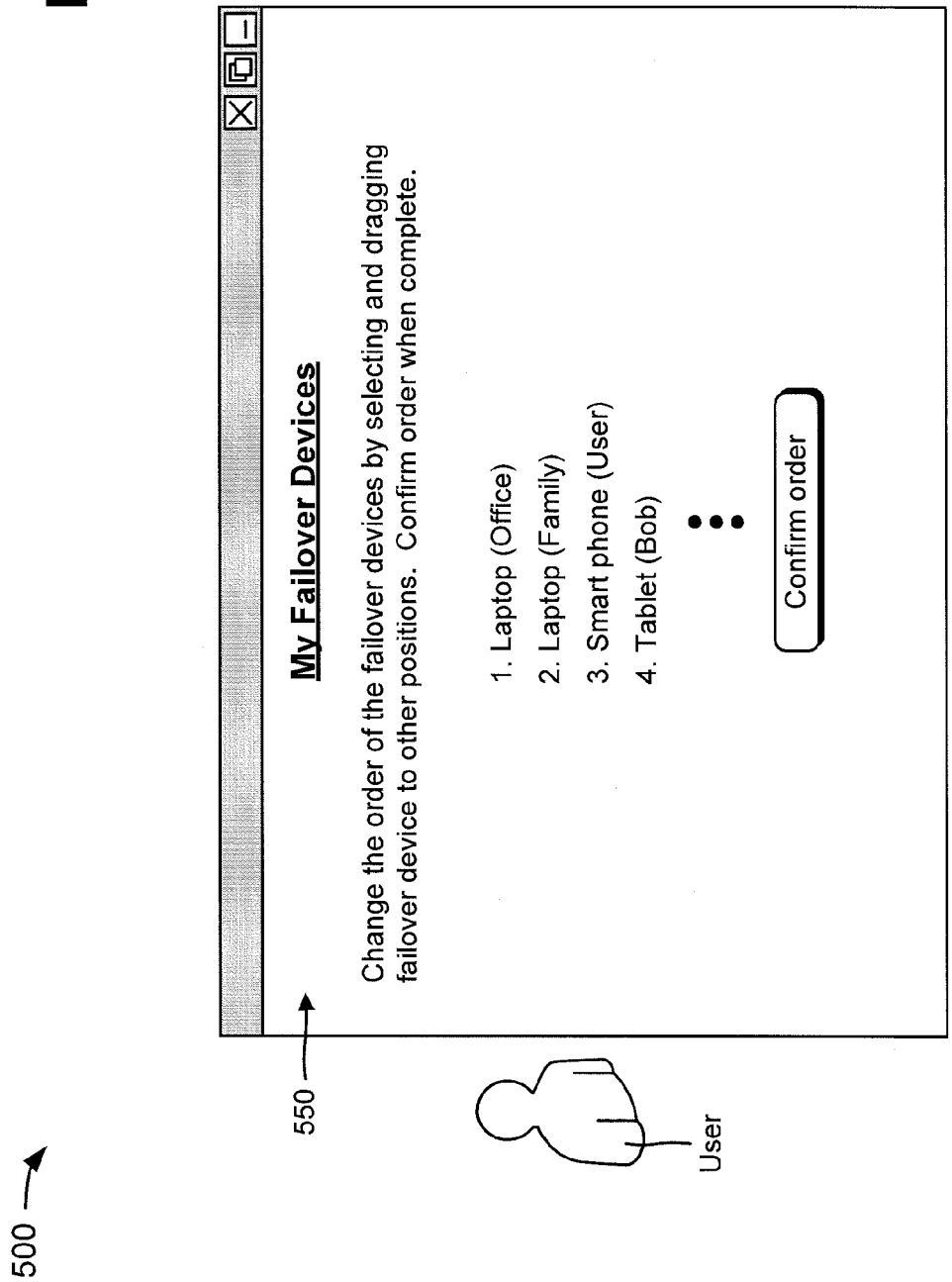
Figure 5E:
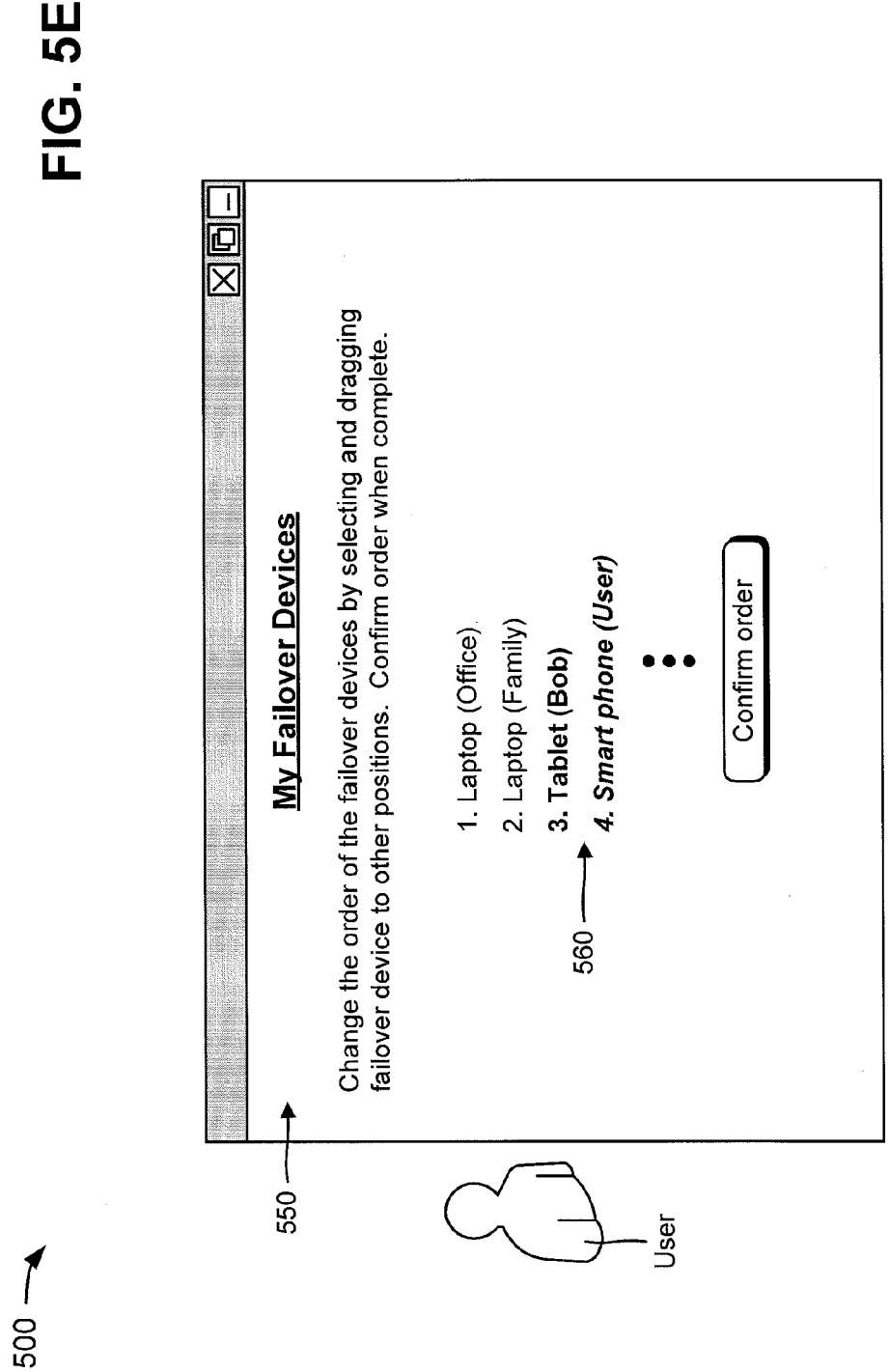

Tablet computer 230 may receive the information for outgoing and incoming traffic, and may order list 530 of failover devices based on the information for outgoing and incoming traffic. For example, tablet computer 230 may change the order of list 530 of failover devices, based on the information for outgoing and incoming traffic, to the following: 1. Laptop (Office), 2. Laptop (Family), 3. Smart phone (User), and 4. Tablet (Bob). Tablet computer 230 may display the modified list 530 of failover devices in a user interface 550, as shown in FIG. 5D. The user may change the order of the modified list 530 of failover devices, via user interface 550, by selecting and moving one or more failover device names to other positions in list 530. For example, the user may move Tablet (Bob) to the third position and may move Smart phone (User) to a fourth position, as indicated by reference number 560 in FIG. 5E. User interface 550 may request that the user confirm the order of the modified list 530 of failover devices. The user may confirm the order of the modified list 530 of failover devices by selecting a mechanism (e.g., a Confirm order button, icon, link, etc.). When the user selects the Confirm order button, tablet computer 230 may store the modified list 530 of failover devices.

As indicated above, FIGS. 5A-5E are provided merely as an example. Other examples are possible and may differ from what was described with regard to FIGS. 5A-5E.

FIGS. 6A and 6B provide a flow chart of an example process 600 for establishing a communication channel with a failover device during a network failure. In some implementations, one or more process blocks of FIG. 6 may be performed by user device 230 and/or monitoring system 240. In some implementations, one or more process blocks of FIG. 6 may be performed by another device or a group of devices separate from or including user device 230 and/or monitoring system 240. Process 600 will be described in terms of user device 230 but may be performed by monitoring system 240.

As shown in FIG. 6A, process 600 may include establishing a communication channel with a network device serving user devices (block 605). For example, a particular user device 230 may establish a communication channel with customer network device 220, and customer network device 220 may serve other user devices 230 in customer premises network 210. In some implementations, one or more of the other user devices 230 may function as failover devices for the particular user device 230. In some implementations, the particular user device 230 may generate a request to access customer network device 220, and may provide the request to customer network device 220. If customer network device 220 accepts the request, customer network device 220 and the particular user device 230 may establish a communication channel. In some implementations, customer network device 220 and the particular user device 230 may communicate information via the communication channel.

As further shown in FIG. 6A, process 600 may include determining whether there is a communication failure with the network device (block 610). For example, the particular user device 230 may determine whether there is a communication failure with customer network device 220. In some implementations, the particular user device 230 may determine there is a communication failure when the communication channel fails between the particular user device 230 and customer network device 220.

As further shown in FIG. 6A, if there is a no communication failure with the network device (block 610—NO), process 600 may include maintaining the communication channel with the network device (block 605). For example, if the particular user device 230 determines that there is not a communication failure with customer network device 220, the particular user device 230 may maintain the communication channel with customer network device 220. In some implementations, customer network device 220 and the particular user device 230 may continue to communicate information via the communication channel.

As further shown in FIG. 6A, if there is a communication failure with the network device (block 610—YES), process 600 may include sending a notification of the communication failure to customer support (block 615). For example, if the particular user device 230 determines that there is a communication failure with customer network device 220, the particular user device 230 may generate a notification of the communication failure. The particular user device 230 may provide the notification to a service provider (e.g., customer support personnel) associated with customer network device 220 and/or network 250. In some implementations, the particular user device 230 may communicate with a network that is separate from network 250, such as wireless network 260. In such implementations, the particular user device 230 may utilize wireless network 260, and a failover device connected to wireless network 260, to provide the notification of the communication failure to network 250. In some implementations, if the particular user device 230 does not communicate with wireless network 260, the notification may be provided by another user device, in customer premises network 210, connected to wireless network 260. In some implementations, the service provider may receive the notification, and may attempt to resolve the communication failure.

As further shown in FIG. 6A, process 600 may include sorting a list of failover devices based on available bandwidths and/or a user configuration associated with the failover devices (block 620). For example, the particular user device 230 may store a list of failover devices, as described above in connection with FIGS. 4-5E. When the particular user device 230 determines that that there is a communication failure with customer network device 220, the particular user device 230 may retrieve the list of failover devices (e.g., from memory 330, FIG. 3), and may sort the list of failover devices based on bandwidths and/or a user configuration associated with the failover devices.

In some implementations, the particular user device 230 may order the list of failover devices based on the user configuration of incoming/outgoing traffic priorities associated with the failover devices and/or the particular user device 230. In some implementations, the particular user device 230 may sort the list of failover devices in descending order based on the incoming/outgoing traffic priorities. In some implementations, the particular user device 230 may arrange the list of failover devices in ascending order based on the incoming/outgoing traffic priorities. In some implementations, the particular user device 230 may order the list of failover devices based on other parameters, such as, for example, the bandwidths associated with the failover devices.

As further shown in FIG. 6A, process 600 may include providing a service request to a failover device (e.g., device "i") on the list of failover devices (block 625). For example, the particular user device 230 may provide a service request to a failover device on the list of failover devices. In some implementations, the service request may include a request to establish a communication channel with the failover device, information associated with the particular user device 230, bandwidth and traffic requirements of the particular user device 230, etc. In some implementations, the particular user device 230 may select a first failover device from the list of failover devices, if the first failover device is available. If the first failover device is not available, the particular user device 230 may select a second failover device from the list of failover devices. In such implementations, the particular user device 230 may provide the service request to the selected failover device.

As further shown in FIG. 6A, process 600 may include determining whether the failover device is available (block 630). For example, the failover device may receive the service request, and may generate a response to the service request. In some implementations, the response may indicate that the failover device is available or unavailable. The failover device may provide the response to the particular user device 230, and the particular user device 230 may determine whether the failover device is available based on the response. In some implementations, if the failover device does not respond to the service request (e.g., if the failover device is powered off), the particular user device 230 may determine that the failover device is unavailable.

As further shown in FIG. 6A, if the failover device is unavailable (block 630—NO), process 600 may include incrementing a counter (e.g., "i") by a value of one (block 635) and returning to process block 625. For example, if the particular user device 230 determines that the failover device is unavailable, the particular user device 230 may select another failover device from the list of failover devices. In some implementations, if the particular user device 230 selects the first failover device from the list of failover devices and the first failover device is unavailable, the particular user device 230 may select a second failover device from the list of failover devices. In such implementations, the particular user device 230 may provide the service request to the selected failover device.

As further shown in FIG. 6A, if the failover device is available (block 630—YES), process 600 may include sending a request, an identifier (ID), and a security token to the failover device (block 640). For example, if the particular user device 230 determines that the failover device is available, the particular user device 230 may generate a request to establish a communication channel with the failover device. In some implementations, the request may include an identifier (e.g., a device identifier) associated with the particular user device 230 and/or a security token that provides authentication of the particular user device 230. The particular user device 230 may provide the request, with the identifier and/or the security token, to the failover device.

As further shown in FIG. 6A, process 600 may include determining whether a confirmation is received from the failover device (block 645). For example, the failover device may receive the request, with the identifier and/or the security token, and may confirm whether the particular user device's 230 request to establish a communication channel with the failover device is accepted. In some implementations, the failover device may confirm whether the particular user device's 230 request to establish a communication channel with the failover device, based on the identifier, the security token, and/or resources available to the failover device, is accepted. For example, if the failover device is available but cannot provide enough bandwidth for the particular user device 230, the failover device may deny the request to establish the communication channel. In some implementations, the failover device may provide, to the particular user device 230, a confirmation or a denial of the request to establish the communication channel.

As further shown in FIG. 6A, if a confirmation is not received from the failover device (block 645—NO), process 600 may return to process blocks 635 and 625. For example, if the particular user device 230 receives a denial of the request to establish the communication channel, the particular user device 230 may select another failover device from the list of failover devices. In some implementations, if the particular user device 230 selects the first failover device from the list of failover devices and the first failover device denies the request to establish the communication channel, the particular user device 230 may select a second failover device from the list of failover devices. In such implementations, the particular user device 230 may provide the service request to the selected failover device.

As shown in FIGS. 6A and 6B, if a confirmation is received from the failover device (block 645—YES), process 600 may include changing the communication channel to the failover device (block 650). For example, if the particular user device 230 receives a confirmation of the request to establish the communication channel, the particular user device 230 may establish a communication channel with the failover device. In some implementations, the particular user device 230 and the failover device may establish the communication channel based on the identifier and/or the security token. In some implementations, the particular user device 230 and the failover device may exchange information, via the communication channel, so that the particular user device 230 may receive a service provided by network 250. For example, the failover device may communicate with network 250 via wireless network 260, and the particular user device 230 may communicate with network 250 via the failover device and wireless network 260.

As further shown in FIG. 6B, process 600 may include maintaining the communication channel with the failover device (block 655). For example, the particular user device 230 may maintain the communication channel with the failover device. In some implementations, the particular user device 230 may maintain the communication channel as long as the failover device does not reject the particular user device 230 or until the communication failure with customer network device 220 is repaired.

As further shown in FIG. 6B, process 600 may include determining whether a rejection is received from the failover device (block 660). For example, the particular user device 230 may determine whether a rejection is received from the failover device. In some implementations, the failover device may generate a rejection when the failover device can no longer accommodate the traffic and/or bandwidth requirements of the particular user device 230. The rejection may indicate that the failover device can no longer maintain the communication channel with the particular user device 230.

As further shown in FIG. 6B, if a rejection is received from the failover device (block 660—YES), process 600 may include ending the communication channel with the failover device (block 665) and returning to process block 625 (FIG. 6A). For example, if the particular user device 230 receives a rejection from the failover device, the particular user device 230 may terminate the communication channel with the failover device. In some implementations, the failover device may terminate the communication channel based on the rejection. In such implementations, the particular user device 230 may select another failover device from the list of failover devices, and may provide the service request to the selected failover device.

As further shown in FIG. 6B, if a rejection is not received from the failover device (block 660—NO), process 600 may include determining whether the communication failure with the network device is repaired (block 670). For example, if the particular user device 230 does not receive a rejection from the failover device, the particular user device 230 may determine whether the communication failure with customer network device 220 has been repaired. In some implementations, the particular user device 230 may determine whether the communication failure has been repaired by attempting to communicate with customer network device 220. If the particular user device 230 is able to communicate with customer network device 220, the particular user device 230 may determine that the communication failure has been repaired. If the particular user device 230 is still unable to communicate with customer network device 220, the particular user device 230 may determine that the communication failure has not been repaired.

As further shown in FIG. 6B, if the communication failure with the network device is not repaired (block 670—NO), process 600 may return to process block 655. For example, if the particular user device 230 determines that the communication failure with customer network device 220 has not been repaired, the particular network device 230 may continue to maintain the communication channel with the failover device. In some implementations, the particular user device 230 may continue to communicate with network 250 via the failover device and wireless network 260.

As further shown in FIG. 6B, if the communication failure with the network device is repaired (block 670—YES), process 600 may include ending the communication channel with the failover device (block 675). For example, if the particular user device 230 determines that the communication failure with customer network device 220 has been repaired, the particular user device 230 may terminate the communication channel with the failover device. In some implementations, the failover device may terminate the communication channel with the particular user device 230 when the communication failure with customer network device 220 has been repaired.

As further shown in FIG. 6B, process 600 may include reestablishing the communication channel with the network device (block 680). For example, if the particular user device 230 determines that the communication failure with customer network device 220 has been repaired, the particular user device 230 may reestablish the communication channel with customer network device 220. In some implementations, the particular user device 230 may communicate with network 250 via customer network device 220 and via the reestablished communication channel with customer network device 220.

In some implementations, if a new user device 230 is added to customer premises network 210, the new user device 230 may synchronize with other user devices 230 in customer premises network 210. For example, network 250 may provide a message to the new user device 230 based on a physical address and/or billing information associated with the new user device 230. The message may request that the new user device 230 synchronize with other user devices 230 in customer premises network 210. If a user of the new user device 230 agrees to synchronize with the other user devices 230, the new user device 230 may synchronize with the other user devices 230. Once the new user device 230 is synchronized with the other user devices 230, the new user device 230 may select failover devices, may function as a failover device, etc., as described above in connection with FIGS. 6A and 6B and as described below in connection with FIGS. 8A and 8B.

Although FIGS. 6A and 6B shows example blocks of process 600, in some implementations, process 600 may include additional blocks, fewer blocks, different blocks, or differently arranged blocks than those depicted in FIGS. 6A and 6B. Additionally, or alternatively, two or more of the blocks of process 600 may be performed in parallel.

Figure 7D:
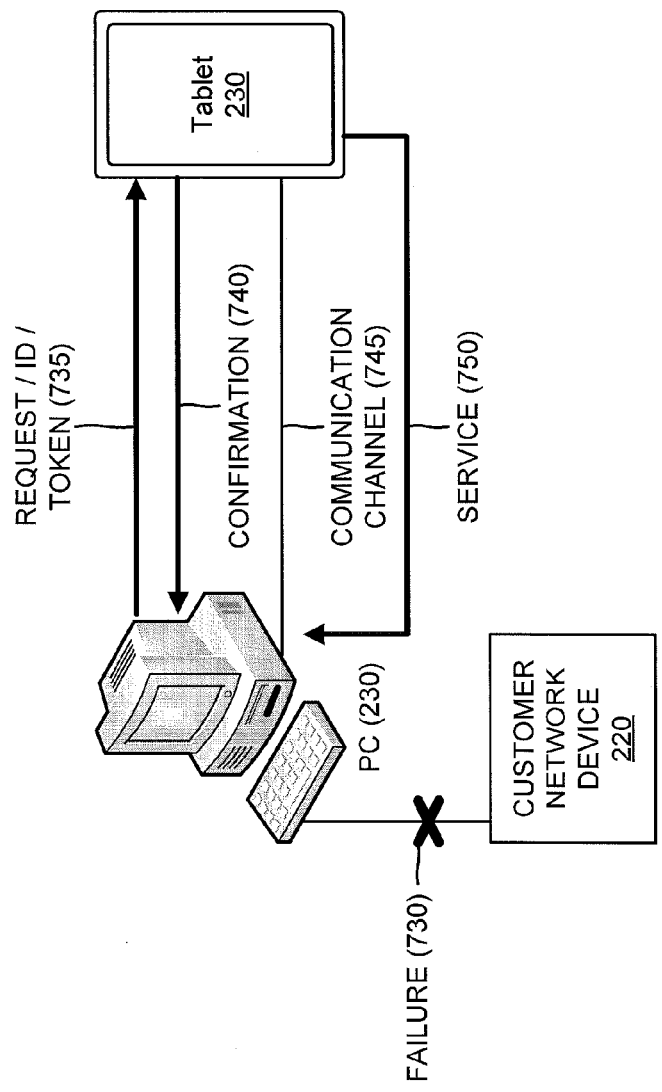

FIGS. 7A-7F are diagrams of an example 700 relating to example process 600 shown in FIGS. 6A and 6B. As shown in FIG. 7A, assume that customer premises network 210 includes a PC 230, a laptop 230, a smart phone 230, and a tablet 230 that may communicate with network 250, via customer network device 220. Further, assume that laptop 230, smart phone 230, and tablet 230 directly communicate with wireless network 260, and that PC 230, laptop 230, smart phone 230, and tablet 230 communicate with each other via short-range wireless communication protocols. As further shown in FIG. 7A, assume that tablet 230 has been designated as a failover device for PC 230.

In example 700, assume that a communication failure 705 occurs between customer network device 220 and network 250 (e.g., due to a storm, equipment failure, etc.), as shown in FIG. 7A. This may cause communication failures 705 between customer network device 220 and PC 230 and between customer network device 220 and tablet 230. When tablet 230 loses communication with customer network device 220, tablet 230 may generate a notification 710 of the failure, and may provide notification 710 to wireless network 260. Wireless network 260 may provide notification 710 to network 250, and a service provider associated with network 250 may attempt to correct communication failure 705.

When PC 230 loses communication with customer network device 220, PC 230 may display a user interface 715 to a user of PC 230, as shown in FIG. 7B. User interface 715 may indicate that a network failure has occurred, and may request that the user select a failover device, from a list of failover devices, in order to continue to receive service (e.g., an Internet service) from network 250. As further shown in FIG. 7B, assume that the user utilizes a selection mechanism (e.g., a mouse) to select information identifying tablet 230 (e.g., "Tablet—10 Gbits/s of bandwidth," shown in bold) from the list of failover devices.

When the user selects tablet 230 as a failover device, PC 230 may generate a message 720 inquiring whether tablet 230 is available for service to PC 230, as shown in FIG. 7C. PC 230 may provide message 720 to tablet 230, and tablet 230 may generate a response 725 to message 720, and may provide response to PC 230. Response 725 may indicate whether tablet 230 is available for service to PC 230. In example 700, assume that tablet 230 is available for service to PC 230.

As shown in FIG. 7D, communication failure 705 may cause a failure 730 in a communication channel established between customer network device 220 and PC 230. Since tablet 230 is available for service, PC 230 may generate a request to establish a communication channel with tablet 230, an identifier (ID) of PC 230, and a token, as indicated by reference number 735 in FIG. 7D. PC 230 may provide request/ID/token 735 to tablet 230, and tablet 230 may determine whether to establish a communication channel with PC 230 based on request/ID/token 735 and/or resources available to tablet 230. Assume that tablet 230 agrees to establish a communication channel with PC 230, and provides a confirmation 740 to PC 230. Further, assume a communication channel 745 is established between PC 230 and tablet 230 based on confirmation 740, as further shown in FIG. 7D. Once communication channel 745 is established, PC 230 may receive service 750 (e.g., the Internet service) from network 250, via wireless network 260 and tablet 230.

Figure 7E:
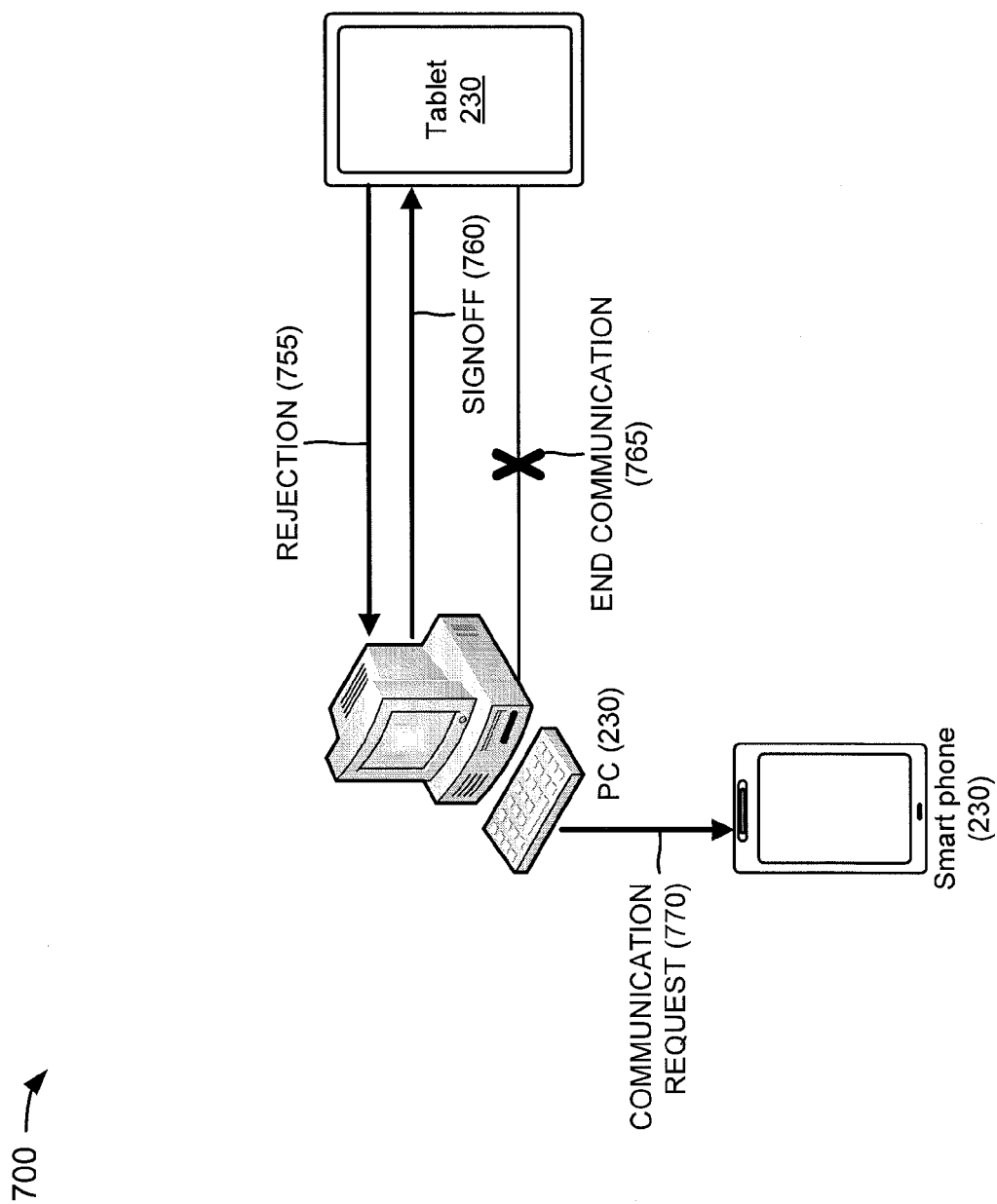

In some implementations, tablet 230 may be unable to provide service 750 to PC 230, after establishing communication channel 745. For example, tablet 230 may be unable to provide a bandwidth requested by PC 230 due to serving other user devices 230 in customer premises network 210. When tablet 230 is unable to continue service 750 for PC 230, tablet 230 may generate a rejection message 755 indicating that tablet 230 cannot provide service 750 to PC 230, as shown in FIG. 7E. Tablet 230 may provide rejection message 755 to PC 230. PC 230 may generate a signoff message 760 as a response to rejection message 755, and may provide signoff message 760 to tablet 230. Signoff message 760 may request that communication channel 745 be terminated. Tablet 230 may end communication channel 745 based on signoff message 760, as indicated by reference number 765 in FIG. 7E. When communication channel 745 is terminated, PC 230 may select another failover device from the list of failover devices. For example, PC 230 may select smart phone 230 as a failover device, and may provide a request 770 to establish a communication channel to smart phone 230, as shown in FIG. 7E.

Now assume that tablet 230 is always able to provide service 750 to PC 230, but that eventually communication failure 705 is repaired. Further, assume that PC 230 receives (e.g., from network 250 and via wireless network 260 and tablet 230) an indication 775 that communication failure 705 has been repaired, as shown in FIG. 7F. PC 230 may generate a signoff message 780 based on indication 775, and may provide signoff message 780 to tablet 230. Signoff message 780 may request that communication channel 745 be terminated. Tablet 230 may end communication channel 745 based on signoff message 780, as indicated by reference number 785 in FIG. 7F. PC 230 may then reestablish the communication channel with customer network device 220, as indicated by reference number 790 in FIG. 7F.

As indicated above, FIGS. 7A-7F are provided merely as an example. Other examples are possible and may differ from what was described with regard to FIGS. 7A-7F.

FIGS. 8A and 8B provide a flow chart of an example process 800 for providing failover device services during a network failure. In some implementations, one or more process blocks of FIG. 8 may be performed by user device 230. In some implementations, one or more process blocks of FIG. 8 may be performed by another device or a group of devices separate from or including user device 230.

As shown in FIG. 8A, process 800 may include receiving information identifying a communication channel failure associated with a network device serving user devices (block 805). For example, a particular user device 230 may establish a communication channel with customer network device 220, and customer network device 220 may serve other user devices 230 in customer premises network 210. In some implementations, the particular user device 230 may function as a failover device for the other user devices 230. In some implementations, the particular user device 230 may generate a request to access customer network device 220, and may provide the request to customer network device 220. If customer network device 220 accepts the request, customer network device 220 and the particular user device 230 may establish a communication channel. In some implementations, customer network device 220 and the particular user device 230 may communicate information via the communication channel.

In some implementations, a communication failure may occur between customer network device 220 and network 250, and the particular user device 230 may receive an indication of the communication failure from customer network device 220. For example, the communication channel between customer network device 220 and the particular user device 230 may terminate, which may provide the indication of the communication failure to the particular user device 230.

As further shown in FIG. 8A, process 800 may include determining whether a service request is received from a user device (block 810). For example, since the particular user device 230 is the failover device for the other user devices 230, one or more of the other user devices 230 may generate a service request when the communication failure occurs. The other user device(s) 230 may provide the service request to the particular user device 230. In some implementations, the particular user device 230 may not receive any service requests from the other user devices 230 when the other user devices 230 do not require service or are requesting service from other failover devices of customer premises network 210. In some implementations, the particular user device 230 may receive a service request from one or more of the other user devices 230. A service request may include a request to establish a communication channel with the other user device 230. In some implementations, the service request may include an identifier (e.g., a device identifier) associated with the other user device 230 and/or a security token that provides authentication of the other user device 230.

As further shown in FIG. 8A, if a service request is not received from the user device (block 810—NO), process 800 may include waiting for a service request (block 815). For example, if the particular user device 230 does not receive any service requests from the other user devices 230, the particular user device 230 may standby and wait for one or more service requests from the other user devices 230.

As further shown in FIG. 8A, if a service request is received from the user device (block 810—YES), process 800 may include determining whether a device identifier and token, included in the service request, is valid (block 820). For example, if the particular user device 230 receives a service request from one of the other user devices 230, the particular user device 230 may determine whether the identifier and/or the security token provided in the service request are valid. In some implementations, the particular user device 230 may store identifiers and information associated with the other user devices 230 of customer premises network 210. In such implementations, the particular user device 230 may determine whether the identifier and/or the security token provided in the service request match any of the identifiers and/or information stored in the particular user device 230.

In some implementations, if the identifier and/or the security token provided in the service request match any of the identifiers and/or information stored in the particular user device 230, the particular user device 230 may determine that the identifier and/or security token are valid, and may authenticate the other user device 230. In some implementations, if the identifier and/or the security token provided in the service request do not match any of the identifiers and/or information stored in the particular user device 230, the particular user device 230 may determine that the identifier and/or security token are invalid, and may not authenticate the other user device 230.

As further shown in FIG. 8A, if the device identifier and the token are invalid (block 820—NO), process 800 may include rejecting the service request (block 825) and returning to process block 815. For example, if the particular user device 230 determines that the identifier and/or security token are invalid, the particular user device 230 may reject the service request from the other user device 230 and may wait for another service request. In some implementations, if the particular user device 230 determines that the identifier and/or security token are invalid, the particular user device 230 may generate a rejection as a response to the service request, and may provide the rejection to the other user device 230. In such implementations, the rejection may deny the other user device 230 access to services via the particular user device 230.

As further shown in FIG. 8A, if the device identifier and the token are valid (block 820—YES), process 800 may include determining whether a user accepts the service request (block 830). For example, if the particular user device 230 determines that the identifier and/or security token are valid, the particular user device 230 may display, to a user of the particular user device 230, a notification indicating that the other user device 230 wishes to establish a communication channel with the particular user device 230. In some implementations, the user may deny the service request, based on the notification, when the user does not permit a communication channel to be established with the other user device 230. In some implementations, the user may accept the service request, based on the notification, when the user permits a communication channel to be established with the other user device 230.

As further shown in FIG. 8A, if the user does not accept the service request (block 830—NO), process 800 may return to process blocks 825 and 815. For example, if the user denies the service request, the particular user device 230 may reject the service request from the other user device 230 and may wait for another service request. In some implementations, if the user rejects the service request, the particular user device 230 may generate a rejection as a response to the service request, and may provide the rejection to the other user device 230.

As further shown in FIG. 8A, if the user accepts the service request (block 830—YES), process 800 may include calculating available resources (block 835). For example, if the user accepts the service request, the particular user device 230 may calculate available resources associated with the particular user device 230. In some implementations, the particular user device 230 may determine bandwidth and/or traffic capabilities of the particular user device 230 when the user accepts the service request.

As further shown in FIG. 8A, process 800 may include determining whether the resources will be maximized by the service request (block 840). For example, the particular user device 230 may determine whether resources requested by the service request exceed the available resources associated with the particular user device 230. In some implementations, the particular user device 230 may determine whether the bandwidth and/or traffic requirements of the service request exceed the bandwidth and/or traffic capabilities of the particular user device 230. In some implementations, the particular user device 230 may determine that the available resources will be maximized by the service request when the resources requested by the service request exceed the available resources associated with the particular user device 230. In some implementations, the particular user device 230 may determine that the available resources will not be maximized by the service request when the resources requested by the service request do not exceed the available resources associated with the particular user device 230.

As further shown in FIG. 8A, if the resources will be maximized by the service request (block 840—YES), process 800 may return to process blocks 825 and 815. For example, if the particular user device 230 determines that the available resources will be maximized by the service request, the particular user device 230 may reject the service request from the other user device 230 and may wait for another service request. In some implementations, the particular user device 230 may generate a rejection as a response to the service request, and may provide the rejection to the other user device 230.

As further shown in FIG. 8A, if the resources will not be maximized by the service request (block 840—NO), process 800 may include sending a confirmation to the user device (block 845). For example, if the particular user device 230 determines that the available resources will not be maximized by the service request, the particular user device 230 may generate a confirmation as a response to the service request, and may provide the confirmation to the other user device 230. In some implementations, the confirmation may indicate that the particular user device 230 is ready to establish a communication channel with the other user device 230 and provide services to the other user device 230.

As shown in FIG. 8B, process 800 may include allocating resources to the user device (block 850). For example, the particular user device 230 may allocate available resources, associated with the particular user device 230, to user device 230 based on the service request. In some implementations, the particular user device 230 may allocate bandwidth and/or traffic capabilities that satisfy the bandwidth and/or traffic requirements of the service request. For example, if the service request requires 10 Gbits/s of bandwidth, 20 bits for incoming traffic, and 30 bits for outgoing traffic, the particular user device 230 may allocate, to the other user device 230, 10 Gbits/s of bandwidth, 20 bits for incoming traffic, and 30 bits for outgoing traffic.

As further shown in FIG. 8B, process 800 may include establishing a communication channel with the user device (block 855). For example, the particular user device 230 may establish a communication channel with the other user device 230. In some implementations, the particular user device 230 and the other user device 230 may establish the communication channel based on the identifier and/or the security token. In some implementations, the particular user device 230 and the other user device 230 may exchange information, via the communication channel, so that the other user device 230 may receive a service provided by network 250. For example, the particular user device 230 may communicate with network 250 via wireless network 260, and the other user device 230 may communicate with network 250 via the particular user device 230 and wireless network 260.

As further shown in FIG. 8B, process 800 may include determining whether the user device exceeds the allocated bandwidth (block 860). For example, while the particular user device 230 and the other user device 230 exchange information, via the communication channel, the particular user device 230 may determine whether the other user device 230 is exceeding the bandwidth allocated to the other user device 230. In some implementations, the particular user device 230 may determine that the other user device 230 exceeds the allocated bandwidth when the bandwidth utilized by the other user device 230, via the communication channel, is greater than the allocated bandwidth. In some implementations, the particular user device 230 may determine that the other user device 230 does not exceed the allocated bandwidth when the bandwidth utilized by the other user device 230, via the communication channel, is less than or equal to the allocated bandwidth.

As further shown in FIG. 8B, if the user device does not exceed the allocated bandwidth (block 860—NO), process 800 may include maintaining the communication channel with the user device (block 865). For example, if the particular user device 230 determines that the other user device 230 does not exceed the allocated bandwidth, the particular user device 230 may maintain the communication channel with the other user device 230. In some implementations, the particular user device 230 may maintain the communication channel as long as the particular user device 230 does not reject the other user device 230 (e.g., due to the other user device 230 exceeding the allocated bandwidth) or until the communication failure with customer network device 220 is repaired.

As further shown in FIG. 8B, if the user device exceeds the allocated bandwidth (block 860—YES), process 800 may include ending the communication channel with the user device (block 870). For example, if the particular user device 230 determines that the other user device 230 exceeds the allocated bandwidth, the particular user device 230 may terminate the communication channel with the other user device 230.

As further shown in FIG. 8B, process 800 may include determining whether a signoff is received from the user device (block 875). For example, if the other user device 230 determines that the communication failure with customer network device 220 has been repaired, the other user device 230 may generate a signoff message, and may provide the signoff message to the particular user device 230. In some implementations, if the other user device 230 determines that the communication failure with customer network device 220 has not been repaired, the other user device 230 may not generate the signoff message.

As further shown in FIG. 8B, if the signoff is not received from the user device (block 875—NO), process 800 may return to process block 865. For example, if the particular user device 230 does not receive the signoff message from the other user device 230, the particular user device 230 may maintain the communication channel with the other user device 230.

As further shown in FIG. 8B, if the signoff is received from the user device (block 875—YES), process 800 may return to process block 870. For example, if the particular user device 230 receives the signoff message from the other user device 230, the particular user device 230 may terminate the communication channel with the other user device 230.

Although FIGS. 8A and 8B show example blocks of process 800, in some implementations, process 800 may include additional blocks, fewer blocks, different blocks, or differently arranged blocks than those depicted in FIGS. 8A and 8B. Additionally, or alternatively, two or more of the blocks of process 800 may be performed in parallel.

Figure 9A:
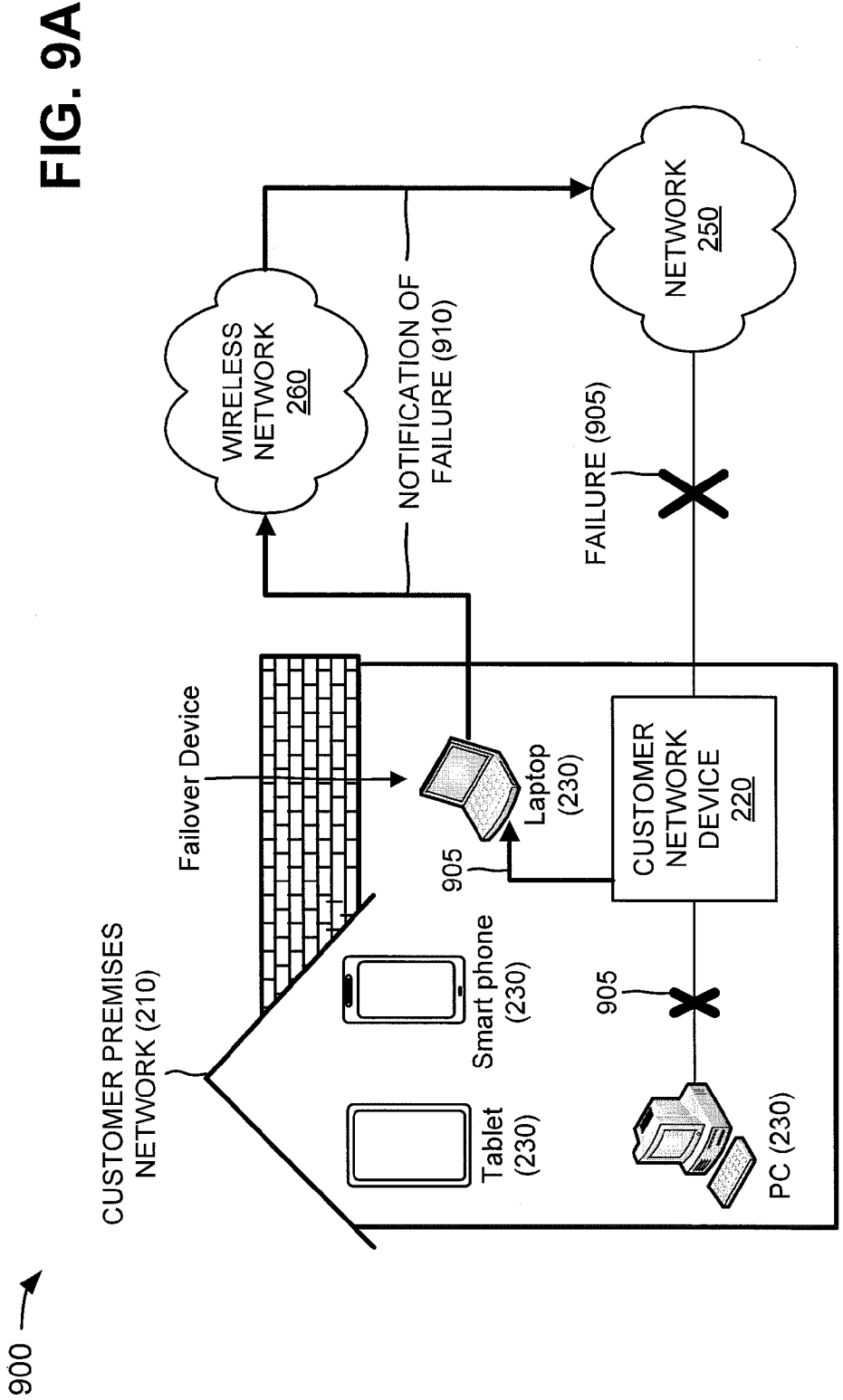

FIGS. 9A-9F are diagrams of an example 900 relating to example process 800 shown in FIGS. 8A and 8B. As shown in FIG. 9A, assume that customer premises network 210 includes a PC 230, a laptop 230, a smart phone 230, and a tablet 230 that may communicate with network 250, via customer network device 220. Further, assume that laptop 230, smart phone 230, and tablet 230 are capable of directly communicating with wireless network 260, and that PC 230, laptop 230, smart phone 230, and tablet 230 communicate with each other via short-range wireless communication protocols. As further shown in FIG. 9A, assume that laptop 230 has been designated as a failover device for PC 230.

As further shown in FIG. 9A, assume that a communication failure 905 occurs between customer network device 220 and network 250, which may cause communication failures 905 between customer network device 220 and PC 230 and between customer network device 220 and laptop 230. When laptop 230 loses communication with customer network device 220, laptop 230 may generate a notification 910 of the failure, and may provide notification 910 to wireless network 260. Wireless network 260 may provide notification 910 to network 250, and a service provider associated with network 250 may attempt to correct communication failure 905.

Figure 9B:
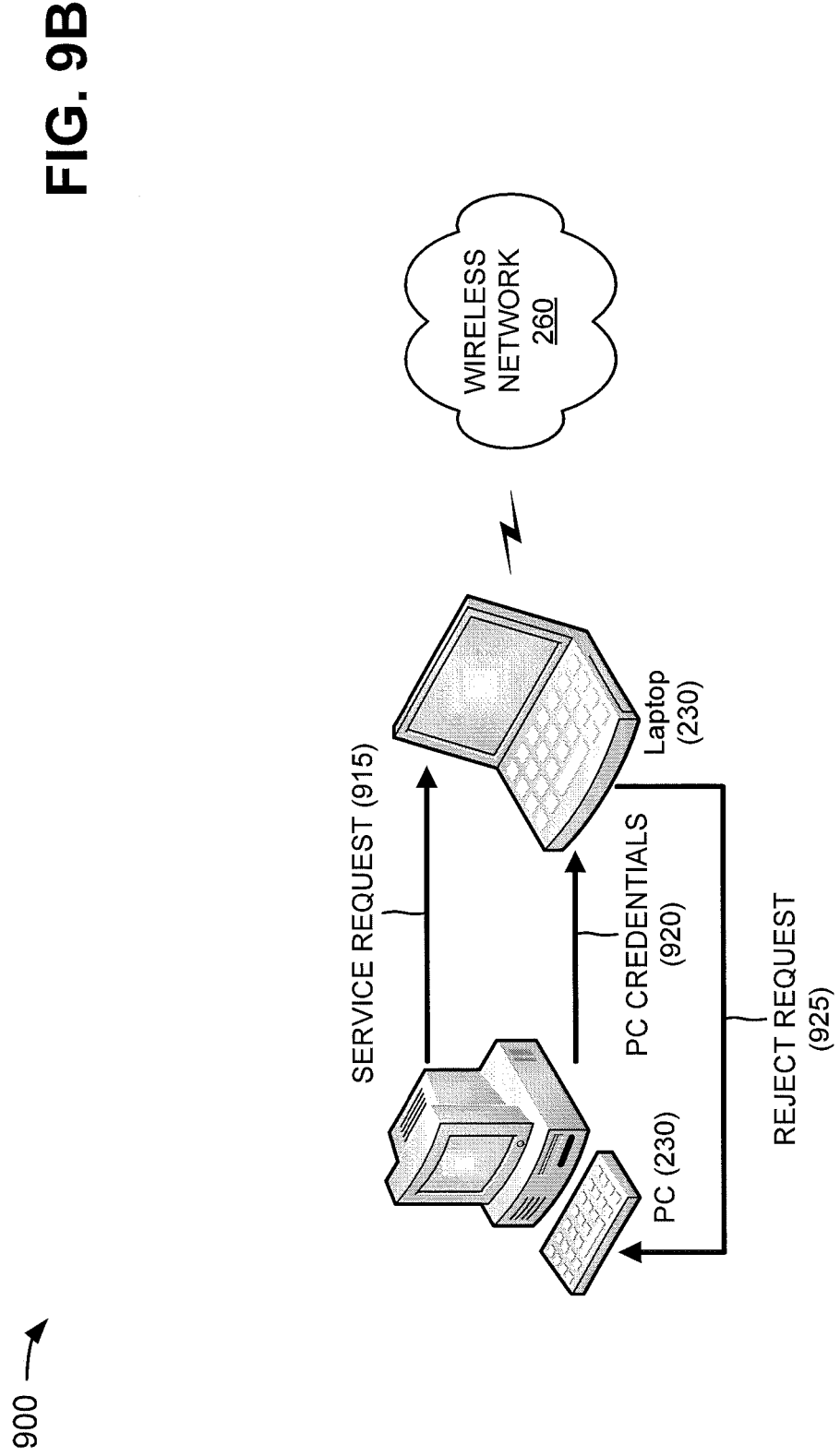
Figure 9D:
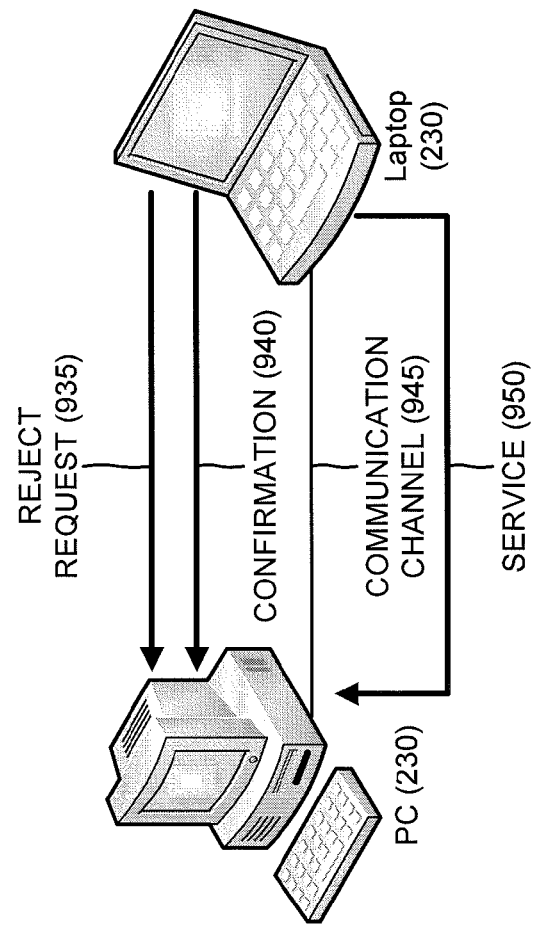

When PC 230 loses communication with customer network device 220, PC 230 may select laptop 230 as a failover device, and may provide a service request 915 to laptop 230, as shown in FIG. 9B. Assume that service request 915 includes a request to establish a communication channel with laptop 230 and bandwidth and/or traffic requirements for PC 230, (e.g., W Gbits/s of bandwidth, X Gbits for incoming traffic, and Y Gbits for outgoing traffic). As further shown in FIG. 9B, PC 230 may provide credentials 920, such as a device identifier and/or a security token, to laptop 230 along with service request 915. Laptop 230 may determine whether to establish a communication channel with PC 230 based on service request 915 and/or resources available to laptop 230. If laptop 230 determines that the available resources of laptop 230 cannot accommodate service request 915, laptop 230 may reject service request 915, as indicated by reference number 925 in FIG. 9B.

If laptop 230 determines that the available resources of laptop 230 can accommodate service request 915, laptop 230 may authenticate PC 230 based on credentials 920. If laptop 230 determines that PC 230 is not authenticated (e.g., due to an invalid device identifier or security token), laptop 230 may reject service request 915, as further indicated by reference number 925 in FIG. 9B.

If laptop 230 determines that PC 230 is authenticated, laptop 230 may display a user interface 930 to a user of laptop 230, as shown in FIG. 9C. User interface 930 may indicate that a network failure has occurred and that PC 230 wants to connect to laptop 230 due to the network failure. User interface 930 may state that PC 230 is requesting "3 Gbits/s" of bandwidth, and may request that the user confirm or deny the connection request from PC 230. If the user wishes to deny the connection request from PC 230, the user may select a selection mechanism (e.g., a Deny connection button, icon, link, etc.). When the user selects the Deny connection button, laptop 230 may reject service request 915, as indicated by reference number 935 in FIG. 9D.

If the user wishes to confirm the connection request from PC 230, the user may select a selection mechanism (e.g., a Confirm connection button, icon, link, etc.), as shown in FIG. 9C. When the user selects the Confirm connection button, laptop 230 may generate and provide a confirmation 940 to PC 230, as further shown in FIG. 9D. A communication channel 945 may be established between PC 230 and laptop 230 based on confirmation 940. Once communication channel 945 is established, PC 230 may receive service 950 (e.g., a video service) from network 250, via wireless network 260 and laptop 230.

Figure 9E:
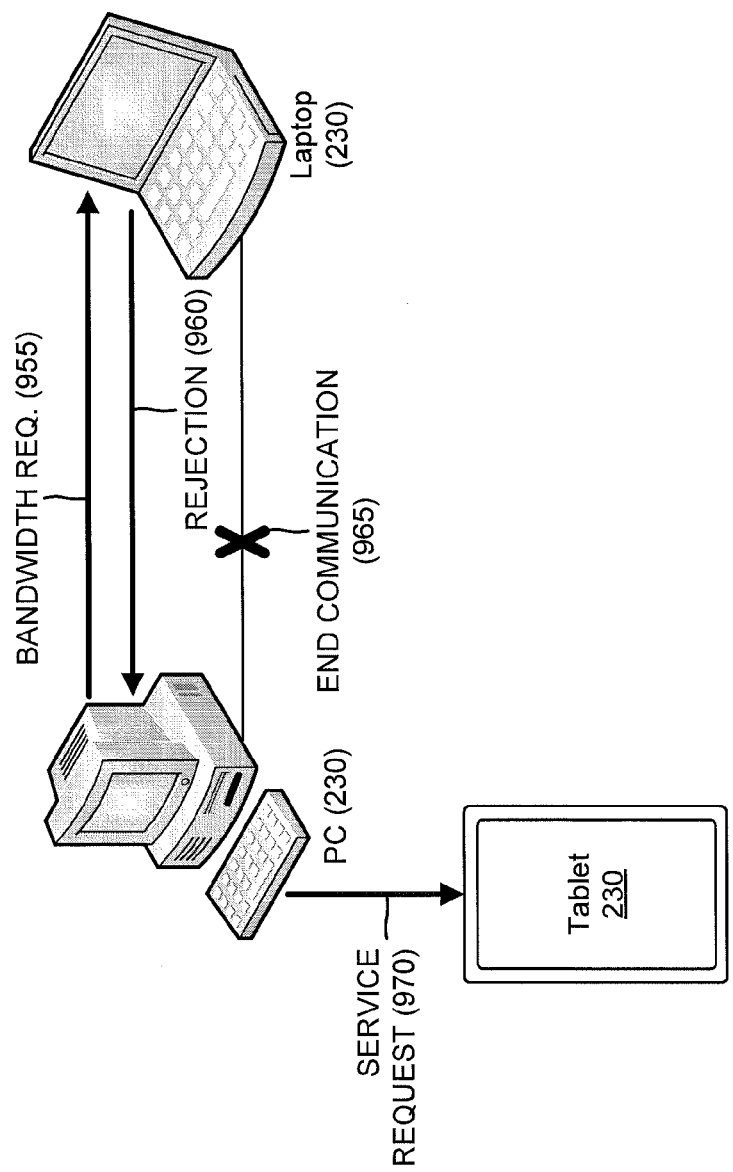

In some implementations, laptop 230 may be unable to provide service 950 to PC 230, after establishing communication channel 945. For example, laptop 230 may be unable to provide a bandwidth 955 requested by PC 230. When laptop 230 is unable to continue service 950 for PC 230, laptop 230 may generate a rejection message 960 indicating that laptop 230 cannot provide service 950 to PC 230, as shown in FIG. 9E. Laptop 230 may provide rejection message 960 to PC 230, and laptop 230 may end communication channel 945, as indicated by reference number 965 in FIG. 9E. When communication channel 945 is terminated, PC 230 may select another failover device from a list of failover devices. For example, PC 230 may select tablet 230 as a failover device, and may provide a request 970 to establish a communication channel to tablet 230, as shown in FIG. 9E.

Figure 9F:
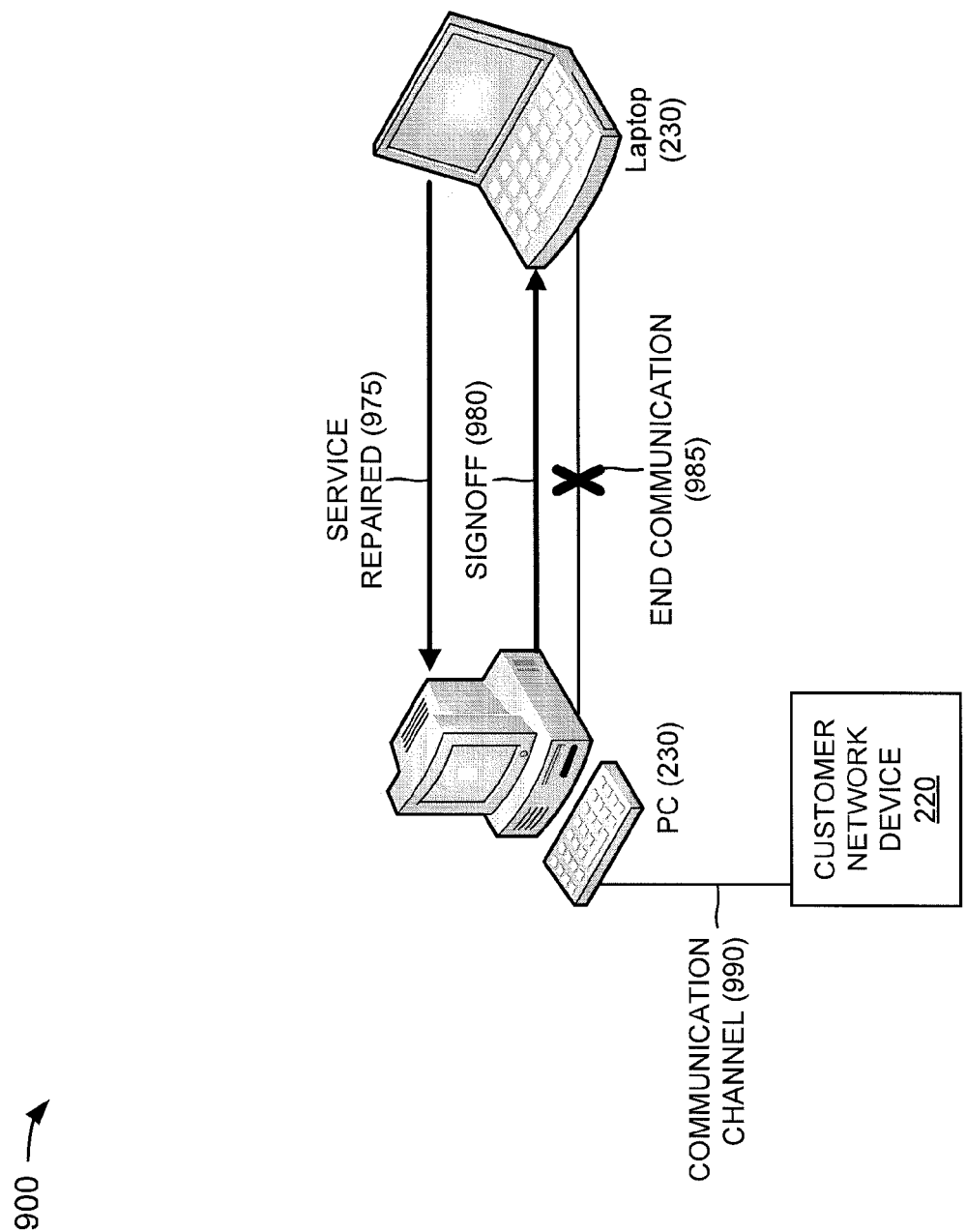

Now assume that eventually communication failure 905 is repaired, and that PC 230 receives (e.g., from network 250 and via wireless network 260 and laptop 230) an indication 975 that communication failure 905 has been repaired, as shown in FIG. 9F. PC 230 may generate a signoff message 980 based on indication 975, and may provide signoff message 980 to laptop 230. Signoff message 980 may request that communication channel 945 be terminated. Laptop 230 may end communication channel 945 based on signoff message 980, as indicated by reference number 985 in FIG. 9F. PC 230 may then reestablish the communication channel with customer network device 220, as indicated by reference number 990 in FIG. 9F.

As indicated above, FIGS. 9A-9F are provided merely as an example. Other examples are possible and may differ from what was described with regard to FIGS. 9A-9F.

Figure 11:
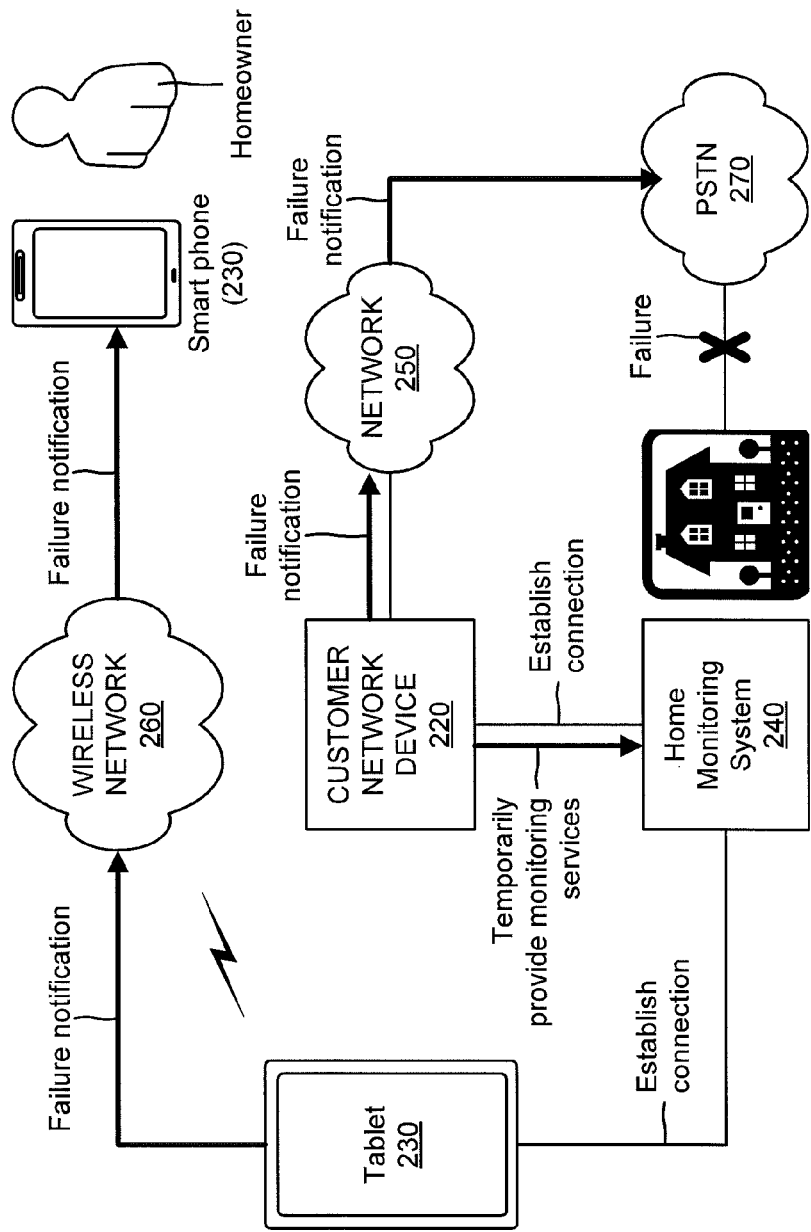
Figure 12:
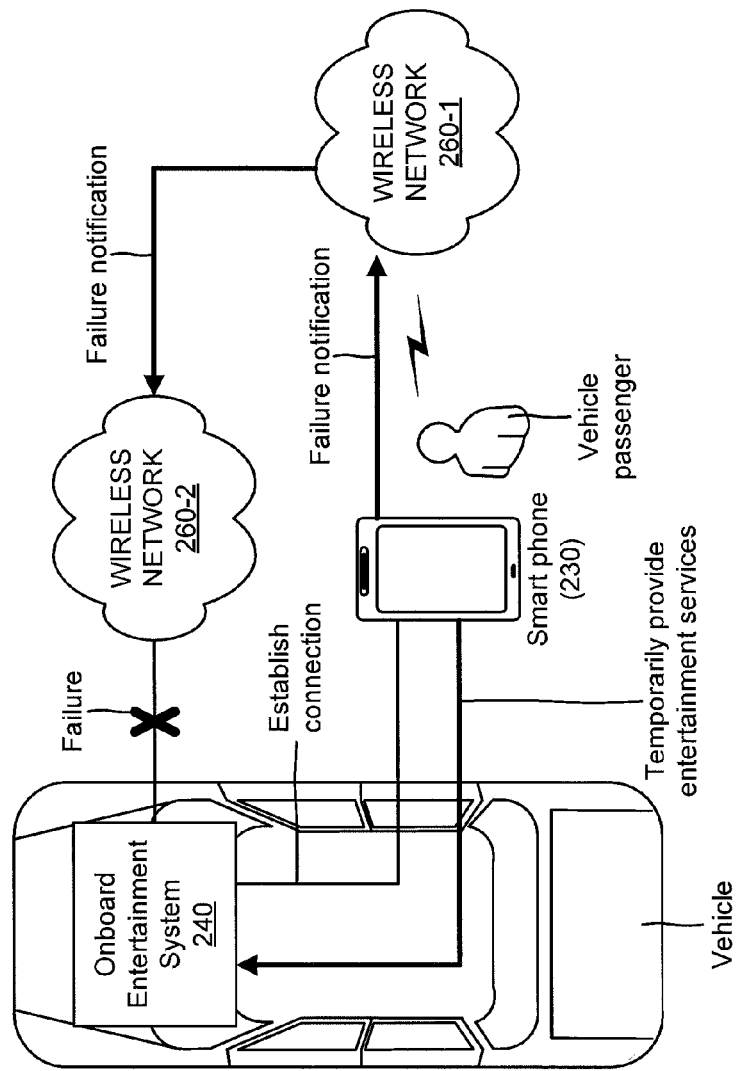

FIGS. 10-12 are diagrams of example use cases 1000-1200 associated with systems and/or methods described herein. As shown in FIG. 10, an elderly person may be associated with customer network device 220, tablet computer 230, and elderly monitoring system 240. Tablet computer 230 may receive services from wireless network 260, and may be a failover device for elderly monitoring system 240. Elderly monitoring system 240 may receive monitoring services from network 250, via customer network device 220, such as monitoring of a heart rate and breathing of the elderly person.

Assume that a storm causes a short circuit of customer network device 220, which may cause communication failures between customer network device 220 and elderly monitoring system 240 and between customer network device 220 and network 250. When the communication failures occur, elderly monitoring system 240 may automatically establish a connection (e.g., a communication channel) with tablet computer 230. Elderly monitoring system 240 may temporarily receive the monitoring services from network 250, via tablet computer 230 and wireless network 260, until customer network device 220 is repaired. Thus, the elderly person may not experience any down time for the monitoring services. As further shown in FIG. 10, tablet computer 230 may provide a failure notification to network 250, via wireless network 260, indicating that customer network device 220 is experiencing problems. A service provider associated with network 250 may dispatch a technician to address the problems with customer network device 220.

As shown in FIG. 11, a homeowner may be associated with customer network device 220, tablet computer 230, smart phone 230, and home monitoring system 240. Customer network device 220 may be a first failover device for home monitoring system 240. Tablet computer 230 and smart phone 230 may receive services from wireless network 260. Tablet computer 230 may be a second failover device for home monitoring system 240. Home monitoring system 240 may receive monitoring services from PSTN 270, such as monitoring of motion detectors, fire detectors, window and door sensors, etc. Assume that the homeowner is on vacation away from home, and has smart phone 230.

As further shown in FIG. 11, assume that a communication failure occurs between home monitoring system 240 and PSTN 270 while the homeowner is on vacation. When the communication failure occurs, home monitoring system 240 may automatically establish a connection (e.g., a communication channel) with the first failover device (e.g., customer network device 220). If customer network device 220 is unavailable, home monitoring system 240 may automatically establish a connection (e.g., a communication channel) with the second failover device (e.g., tablet computer 230). Home monitoring system 240 may temporarily receive the monitoring services from PSTN 270, via customer network device 220 and network 250, until the communication failure is repaired. If customer network device 220 is unavailable, home monitoring system 240 may temporarily receive the monitoring services from PSTN 270, via tablet computer 230 and wireless network 260.

As further shown in FIG. 11, tablet computer 230 may provide a failure notification to smart phone 230 and the homeowner, via wireless network 260. The failure notification may indicate that the communication channel between home monitoring system 240 and PSTN 270 is experiencing problems. Customer network device 220 may provide another failure notification to PSTN 270, via network 250, indicating problems with home monitoring system 240. A service provider associated with PSTN 270 and/or home monitoring system 240 may dispatch a technician to address the problems with home monitoring system 240.

As shown in FIG. 12, assume that a vehicle passenger has a smart phone 230 in a vehicle with an onboard entertainment system 240. Assume that smart phone 230 receive services from a first wireless network 260-1, and is a failover device for onboard entertainment system 240. Assume that onboard entertainment system 240 receives entertainment services from a second wireless network 260-2, such as satellite radio.

As shown in FIG. 12, assume that a communication failure occurs between onboard entertainment system 240 and second wireless network 260-2. When the communication failure occurs, onboard entertainment system 240 may automatically establish a connection (e.g., a communication channel) with smart phone 230. Onboard entertainment system 240 may temporarily receive the entertainment services from second wireless network 260-2, via smart phone 230 and first wireless network 260-1, until the communication failure is corrected. Thus, the vehicle passenger may not experience any down time for the entertainment services. As further shown in FIG. 12, smart phone 230 may provide a failure notification to second wireless network 260-2, via first wireless network 260-1, indicating that there is a communication failure between onboard entertainment system 240 and second wireless network 260-2. A service provider associated with second wireless network 260-2 may dispatch a technician to address the communication failure.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a device, designations of one or more other devices as failover devices;
    creating, by the device, a list of failover devices based on the designations;
    sorting, by the device, the list of failover devices based on available bandwidths and traffic configurations associated with the failover devices;
    storing, by the device, the list of failover devices after sorting the list of failover devices;
    receiving, by the device and from a network device, an indication of a communication failure associated with the network device,
        the network device connecting the device to a first network, and
        the network device serving the one or more other devices;
    selecting, by the device and based on the communication failure, a failover device from the list of failover devices,
        the list of failover devices identifying at least one of the one or more other devices, and
        the selected failover device connecting to a second network that is separate from the first network;
    providing, by the device and to the selected failover device, a request to receive a service from the first network;
    establishing, by the device and when the selected failover device accepts the request, a communication channel with the selected failover device; and
    receiving, by the device, the service from the first network via the selected failover device, the communication channel, and the second network.

2. The method of claim 1, where the request includes an identifier of the device or a security token associated with the device, the selected failover device determines whether to accept the request based on the identifier or the security token, and the method further comprises:
    providing, when the selected failover device denies the request, the request to another failover device provided in the list of failover devices.

3. The method of claim 1, further comprising:
    receiving a rejection message from the selected failover device after the communication channel is established;
    terminating the communication channel with the selected failover device based on the rejection message; and
    providing the request to another failover device provided in the list of failover devices.

4. The method of claim 1, further comprising:
    receiving an indication that the communication failure is repaired;
    terminating the communication channel with the selected failover device based on the indication that the communication failure is repaired;
    establishing another communication channel with the network device; and
    receiving the service from the first network via the network device and the other communication channel.

5. The method of claim 1, further comprising:
    receiving an indication that the communication failure is repaired;
    terminating the communication channel with the selected failover device based on the indication that the communication failure is repaired;
    receiving an indication of another communication failure associated with the network device;
    receiving, from a particular device of the one or more other devices and based on the other communication failure, a second request to receive the service from the first network;
    determining whether the device has available resources to satisfy the second request;
    rejecting the second request when the device has insufficient resources to satisfy the second request;
    establishing another communication channel with the particular device when the device has sufficient resources to satisfy the second request; and
    providing the service from the first network to the particular device via the other communication channel and the second network.

6. The method of claim 5, further comprising:
    receiving an indication that the other communication failure is repaired; and terminating the other communication channel with the particular device based on the indication that the other communication failure is repaired.

7. The method of claim 1, further comprising:
receiving a change to an order of the list of failover devices; and
changing the order of the list of failover devices based on receiving the change.

8. A device, comprising:
one or more processors to:
receive designations of failover devices,
create a list of failover devices based on the designations,
sort the list of failover devices based on available bandwidths and traffic configurations associated with the failover devices,
store the list of failover devices after sorting the list of failover devices,
determine a communication failure associated with a first network,
select, based on the communication failure, a failover device from the list of failover devices,
the device and the failover devices, provided in the list of failover devices, communicating via short-range communications,
the selected failover device connecting to a second network, separate from the first network,
provide, to the selected failover device, a request to receive a service from the first network,
establish, when the selected failover device accepts the request, a communication channel with the selected failover device; and
receive the service from the first network via the selected failover device, the communication channel, and the second network.

9. The device of claim 8, where the one or more processors are further to:
provide, when the selected failover device denies the request, the request to another failover device provided in the list of failover devices.

10. The device of claim 8, where the one or more processors are further to:
determine that the communication failure is repaired,
terminate the communication channel with the selected failover device based on the communication failure being repaired, and
receive the service directly from the first network, without using the selected failover device, after terminating the communication channel with the selected failover device.

11. The device of claim 8, where, prior to the communication failure, the one or more processors are further to:
provide the list of failover devices for display,
receive a change to an order of the list of failover devices,
modify the order of the list of failover devices based on the change, and
store the modified list of failover devices.

12. The device of claim 8, where the one or more processors are further to:
determine that the communication failure is repaired,
terminate the communication channel with the selected failover device based on the communication failure being repaired,
determine another communication failure associated with the first network,
receive, from a particular failover device and based on the other communication failure, a second request to receive the service from the first network,
receive acceptance of the second request from a user of the device,
determine whether the device has available resources to satisfy the second request,
reject the second request when the device has insufficient resources to satisfy the second request,
establish another communication channel with the particular failover device when the device has sufficient resources to satisfy the second request, and
provide the service from the first network to the particular failover device via the other communication channel and the second network.

13. The device of claim 12, where the one or more processors are further to:
determine that the other communication failure is repaired, and
terminate the other communication channel with the particular failover device based on the other communication failure being repaired.

14. A non-transitory computer-readable medium for storing instructions, the instructions comprising:
one or more instructions that, when executed by one or more processors of a device, cause the one or more processors to:
receive designations of one or more other devices as failover devices,
create a list of failover devices based on the designations,
sort the list of failover devices based on available bandwidths and traffic configurations associated with the failover devices,
store the list of failover devices after sorting the list of failover devices,
determine a communication failure associated with a first network,
select, based on the communication failure, a failover device from the list of failover devices,
the device and the failover devices, provided in the list of failover devices, communicating via short-range communications,
the selected failover device connecting to a second network, separate from the first network,
provide, to the selected failover device, a request to receive a service from the first network,
establish, when the selected failover device accepts the request, a communication channel with the selected failover device, and
receive the service from the first network via the selected failover device, the communication channel, and the second network.

15. The computer-readable medium of claim 14, where the instructions further comprise:
one or more instructions that, when executed by the one or more processors, cause the one or more processors to:
determine that the communication failure is repaired,
terminate the communication channel with the selected failover device based on the communication failure being repaired, and
receive the service directly from the first network, without using the selected failover device, after terminating the communication channel with the selected failover device.

16. The computer-readable medium of claim 14, where the instructions further comprise:

one or more instructions that, when executed by the one or more processors, cause the one or more processors to:
  receive a rejection message from the selected failover device after the communication channel is established,
  terminate the communication channel with the selected failover device based on the rejection message, and
  provide the request to another failover device provided in the list of failover devices.

17. The computer-readable medium of claim 16, where:
the request includes an identifier of the device or a security token associated with the device, and
the selected failover device determines whether to accept the request based on the identifier or the security token.

18. The computer-readable medium of claim 14, where the instructions further comprise:
one or more instructions that, when executed by the one or more processors, cause the one or more processors to:
  determine that the communication failure is repaired,
  terminate the communication channel with the selected failover device based on the communication failure being repaired,
  determine another communication failure associated with the first network,
  receive, from a particular failover device and based on the other communication failure, a second request to receive the service from the first network,
  determine whether the device has available resources to satisfy the second request,
  reject the second request when the device has insufficient resources to satisfy the second request,
  establish another communication channel with the particular failover device when the device has sufficient resources to satisfy the second request, and
  provide the service from the first network to the particular failover device via the other communication channel and the second network.

19. The computer-readable medium of claim 18, where the instructions further comprise:
one or more instructions that, when executed by the one or more processors, cause the one or more processors to:
  determine that the other communication failure is repaired, and
  terminate the other communication channel with the particular failover device based on the other communication failure being repaired.

20. The computer-readable medium of claim 14, where the instructions further comprise:
one or more instructions that, when executed by the one or more processors, cause the one or more processors to:
  receive a change to an order of the list of failover devices, and
  change the order of the list of failover devices based on receiving the change.

* * * * *